(12) United States Patent
Mueller et al.

(10) Patent No.: US 10,482,525 B2
(45) Date of Patent: Nov. 19, 2019

(54) COMPUTER SYSTEMS AND METHODS FOR PROCESSING AND MANAGING PRODUCT ORDERS

(71) Applicant: KEENWAWA, INC., San Francisco, CA (US)

(72) Inventors: Jason Mueller, San Francisco, CA (US); Scott Drummond, San Francisco, CA (US); David Friedberg, San Francisco, CA (US); Tim Young, San Francisco, CA (US); Adam Hiatt, San Francisco, CA (US)

(73) Assignee: Keenwawa, Inc., San Francisco, CA (US)

( * ) Notice: Subject to any disclaimer, the term of this patent is extended or adjusted under 35 U.S.C. 154(b) by 492 days.

(21) Appl. No.: 15/247,511

(22) Filed: Aug. 25, 2016

(65) Prior Publication Data
US 2017/0055752 A1   Mar. 2, 2017

Related U.S. Application Data

(60) Provisional application No. 62/209,805, filed on Aug. 25, 2015.

(51) Int. Cl.
*G06Q 30/06* (2012.01)
*G06Q 20/12* (2012.01)
*G07G 1/14* (2006.01)
*G06Q 50/12* (2012.01)

(52) U.S. Cl.
CPC ......... *G06Q 30/0641* (2013.01); *G06Q 20/12* (2013.01); *G06Q 30/0621* (2013.01); *G07G 1/14* (2013.01); *G06Q 50/12* (2013.01)

(58) Field of Classification Search
CPC .............. G06Q 30/0641; G06Q 20/12; G06Q 30/0621; G06Q 50/12; G07G 1/14
See application file for complete search history.

(56) References Cited

U.S. PATENT DOCUMENTS

| | | |
|---|---|---|
| 6,466,368 B1 | 10/2002 | Piepel et al. |
| 2002/0035515 A1 | 3/2002 | Moreno |
| 2006/0218040 A1 | 9/2006 | Sabapathypillai |
| 2007/0109764 A1 | 5/2007 | Bienick |
| 2010/0219958 A1 | 9/2010 | Caldwell et al. |
| 2012/0285089 A1 | 11/2012 | Arthwohl et al. |
| 2013/0130208 A1 | 5/2013 | Riscalla |

(Continued)

FOREIGN PATENT DOCUMENTS

EP   1 793 326 A2   6/2007

OTHER PUBLICATIONS

International Searching Authority, "Search Report" in application No. PCT/US16/53132, dated Dec. 23, 2016, 15 pages.
Current Claims in application No. PCT/US2016/053132, dated Dec. 2016, 5 pages.
The International Bureau of WIPO, "International Preliminary Report on Patentability", in application No. PCT/US2016/053132, dated Feb. 27, 2018, 9.

(Continued)

*Primary Examiner* — Mohamed Barakat
(74) *Attorney, Agent, or Firm* — Hickman Palermo Becker Bingham LLP

(57) ABSTRACT

New technologies for real-time processing and managing product orders are described. The technologies utilize mobile communication and intelligent analysis to reduce waiting time, keep product fresh, and guarantee product delivery. Specific examples are given in the context of meal orders.

25 Claims, 15 Drawing Sheets

(56) References Cited

U.S. PATENT DOCUMENTS

| | | | |
|---|---|---|---|
| 2013/0275236 A1* | 10/2013 | Koke | G06Q 50/12 |
| | | | 705/15 |
| 2014/0078407 A1 | 3/2014 | Green et al. | |
| 2014/0089077 A1* | 3/2014 | Zuckerman | G07F 17/0064 |
| | | | 705/14.37 |
| 2014/0311173 A1* | 10/2014 | Nilles | A47F 3/043 |
| | | | 62/256 |
| 2014/0351068 A1* | 11/2014 | Renfroe | G06Q 30/0641 |
| | | | 705/15 |
| 2015/0042746 A1* | 2/2015 | Lewis | G07F 11/002 |
| | | | 348/14.03 |
| 2016/0042315 A1 | 2/2016 | Field-Darragh et al. | |
| 2016/0058181 A1 | 3/2016 | Han et al. | |
| 2017/0228686 A1 | 8/2017 | Bermudez Rodriguez et al. | |

OTHER PUBLICATIONS

Current Claims in application No. PCT/US2016/053132, dated Feb. 2018, 5 pages.
The International Searching Authority, "Search Report and Written Opinion" in application No. PCT/US19/24641, dated Jun. 18, 2019, 13 pages.
European Patent Office, "Search Report" in application No. 16840267.5-1217, dated Apr. 30, 2019, 11 pages.
European Claims in application No. 16840267.5-1217, dated Apr. 2019, 1 page.
Current Claims in application No. PCT/US 19/24641, dated Jun. 2019, 4 pages.

* cited by examiner

Door opens automatically...

*cubby door closes, displays quinoa fun fact and returns to vacant state

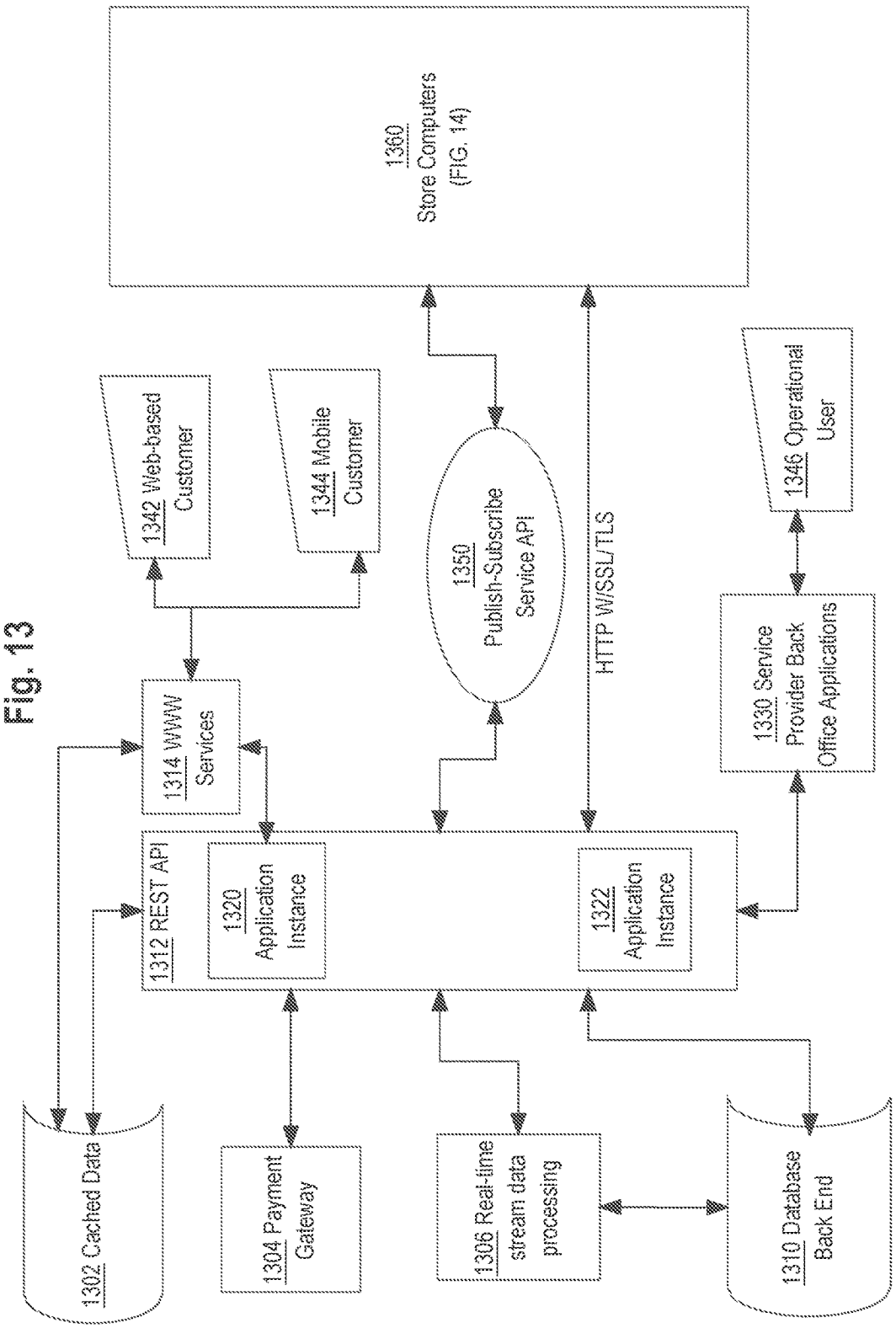

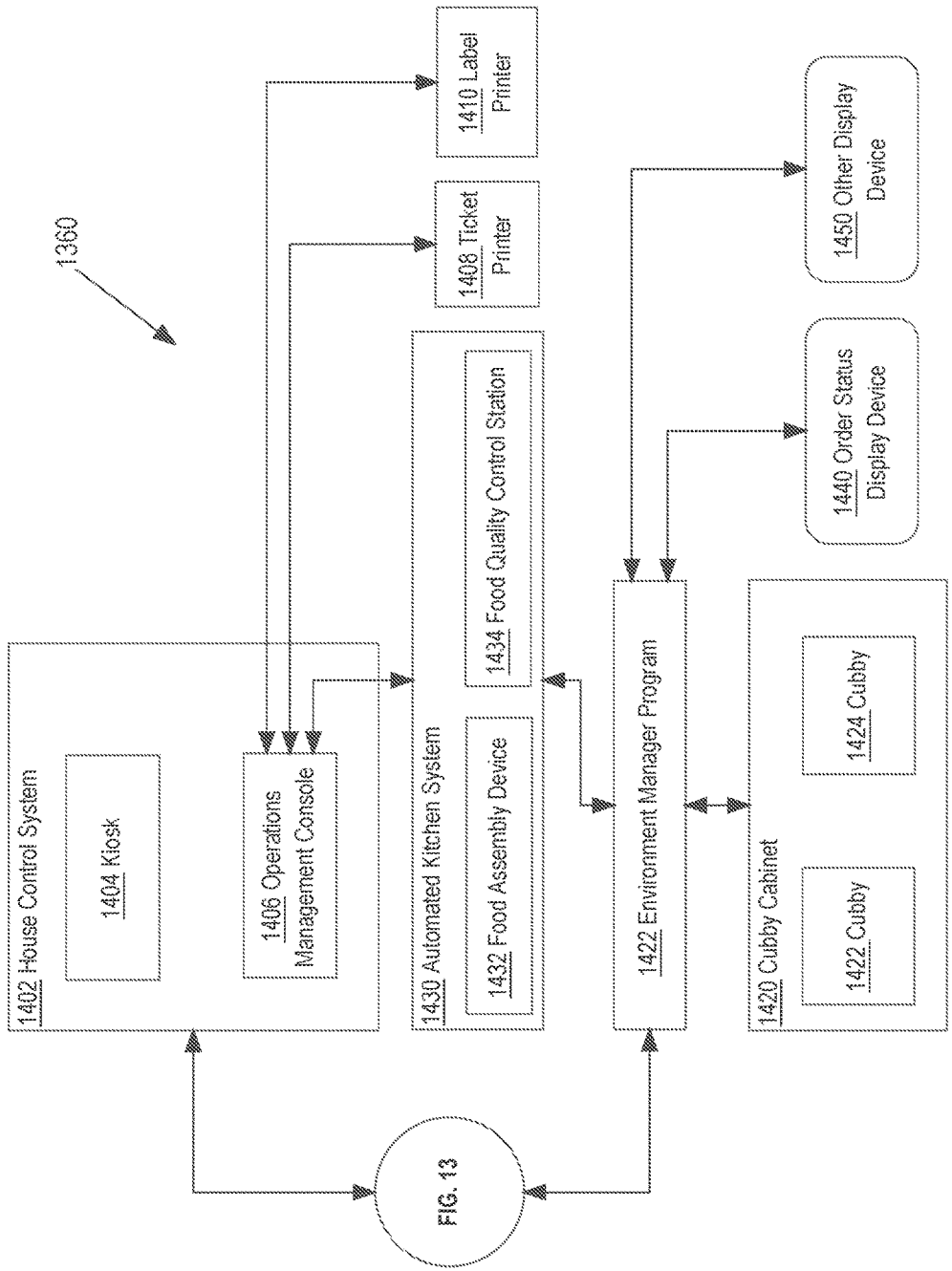

COMPUTER SYSTEMS AND METHODS FOR PROCESSING AND MANAGING PRODUCT ORDERS

BENEFIT CLAIM

This application claims the benefit under 35 U.S.C. 119(e) of provisional application 62/209,805, filed Aug. 25, 2015, the entire contents of which are hereby incorporated by reference for all purposes as if fully set forth herein.

COPYRIGHT STATEMENT

A portion of the disclosure contains material which is subject to copyright protection. The copyright owner has no objection to reproduction of the disclosure in the form in which it appears in the files of the US Patent & Trademark Office, but otherwise all rights are reserved. Copyright © 2016 Keenwawa, Inc. All rights reserved.

BACKGROUND OF THE DISCLOSURE

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The mechanism of ordering and preparation of meals and food in restaurants and food delivery services largely is based on preparation to order. Typically, waiting time is long. Even though individuals can place orders for meals remotely and pick up later to reduce waiting time, products that are prepared before pickup cannot maintain freshness. There is a need to shorten the time of preparing products that are fresh or perishable, such as food or meals, while maintaining the quality and nutritional content of the products.

SUMMARY OF THE INVENTION

The appended claims may serve as a summary of the invention.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which:

FIG. 13 illustrates an example networked computer system with which an embodiment may be implemented.

FIG. 14 illustrates a retail store environment, and networked computers within it, that may be used to implement an embodiment in coordination with the elements of FIG. 13.

DESCRIPTION OF THE PREFERRED EMBODIMENTS

Figure 1:
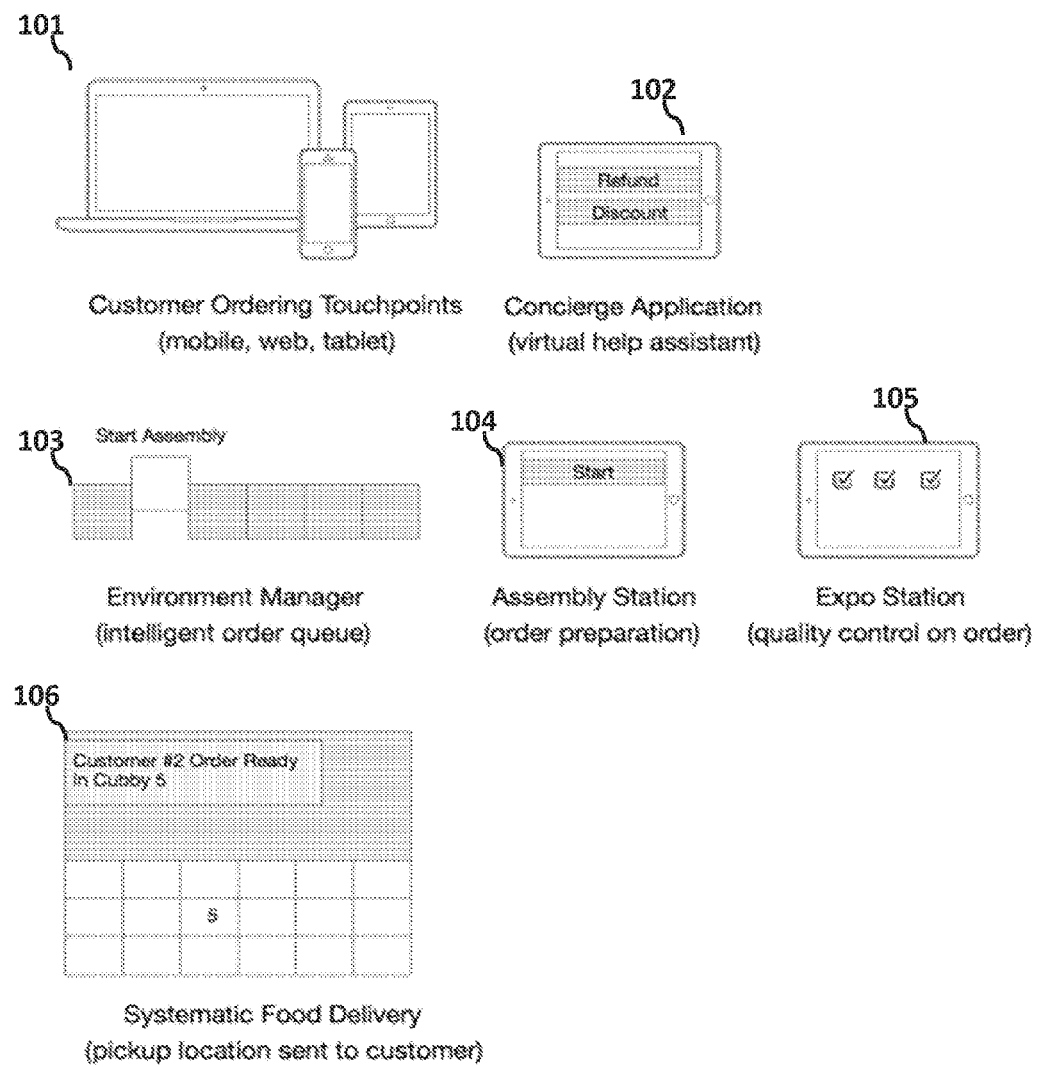
FIG. 1 illustrates an example system for product ordering and preparation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. GENERAL OVERVIEW
2. EXAMPLE IMPLEMENTATION ENVIRONMENT
2.1 MEAL ORDERING KIOSK OR APP
2.2 PRODUCT ORDERING INTERFACE
2.3 ORDER PREPARATION SYSTEM
2.4 PREDICTION
2.5 CABINET HOUSING AND DELIVERING PRODUCTS
3. IMPLEMENTATION EXAMPLE—HARDWARE AND SOFTWARE
3.1 DIGITAL PROCESSING DEVICE
3.2 NON-TRANSITORY COMPUTER READABLE STORAGE MEDIUM
3.3 WEB APPLICATION
3.4 STANDALONE APPLICATION
3.5 SOFTWARE MODULES
3.6 DATABASES
4. OTHER DISCLOSURE
5. EXTENSIONS AND ALTERNATIVES

1. General Overview

In an embodiment, a new technical system for product ordering and preparation is disclosed. Specific examples are given in the context of meal ordering and preparation, but the same techniques also can be applied to other products. In an embodiment, to shorten waiting time, the technology communication networks and mobile computing devices to allow users to order products or meals in any location. To maintain freshness of prepared foods, a product preparation site, such as a restaurant or factory is equipped with an intelligent computing system to manage orders, assemble products, and finalize product preparation. Furthermore, a management module in the system is configured to predict the quantity of source materials that are needed, with the effects of less waste and faster preparation. The system can further execute targeted marketing, with effects of higher loyalty, stronger engagement and easier feedback capturing.

In one aspect, a device for housing and delivering a product to a designated recipient is provided, the device comprising: a digital signal processor, a memory module and a network interface; a cabinet comprising a compartment or "cubby" having a front door, wherein the front door comprises a digital screen; and one or more sensors located in the cubby and configured to monitor an interior space of the cubby. The digital screen may be mounted in, set into, or otherwise affixed in association with the front door of the cubby as an integral part of the front door. In some embodiments, the product comprises one or more meals, or one or more prepared meals, or one or more prepared products. In some embodiments, the cabinet further comprises a back door; in one embodiment, the product is placed in the cubby through the back door. In some embodiments, the network interface is configured to receive instructions from another computing device to configure the digital screen to display particular data. In some embodiments, the cubby comprises an illumination source, such as an LED light, which is used to illuminate the interior space of the cubby. In some embodiments, the digital screen comprises an illumination source such as an LED light. In some embodiments, the digital screen comprises a transparent LED light. In some embodiments, the digital screen is configured to display data or indicia, such as a dynamic brand graphic, when the one or more sensors detect that the cubby is vacant. In some embodiments, the digital screen is configured to go dark, with any illumination off, when the one or more sensors detect that the product is being loaded to the cubby. In some embodiments, the digital screen is configured to go clear, so that the product in the cubby is visible through the front door and digital screen, when the one or more sensors detect that the product has been placed in the cubby. In some embodiments, the digital screen is configured to display an order number when the one or more sensors detect that the product has been placed in the cubby. In some embodiments, the digital screen is configured to display a name when the one or more sensors detect that the product has been placed in the cubby. In some embodiments, the digital screen is configured to allow an individual to activate a mechanism of opening the front door. In some embodiments, the front door is configured to automatically open upon the individual correctly activating a mechanism of opening the front door. In some embodiments, the front door is configured to automatically close and the digital screen is configured to display a message when the one or more sensors detect that the product has been retrieved by an individual. In some embodiments, the digital screen is configured to display a message when the one or more sensors detect that a prepared meal has been retrieved by an individual. In some embodiments, the device further comprises a laser shield located at a ceiling; in further embodiments, the laser shield is configured to detect an obstruction in a way of the front door when the front door is moving. As alternatives to the laser shield, a sonar detection device or capacitive sensing device may be positioned at the ceiling and programmed, alone or in combination with the computers shown in the drawings, to detect motion of the front door. In some cases, the obstruction comprises a hand. In some embodiments, the front door stops moving when the obstruction is detected. In some embodiments, the cabinet or the cubby is in a remote location away from a product preparation site; in further embodiments, the product preparation site comprises a restaurant, or a factory, or a food processing center, or a combination thereof. In some embodiments, the cabinet is movable. In some embodiments, the cubby is movable. In some embodiments, the cubby is secured by a cubby locking mechanism; in further embodiments, the cubby locking mechanism is unlocked by a key code, or by a biometric recognition mechanism, which comprises a facial recognition mechanism, or a finger print recognition mechanism, or a palm print recognition mechanism, or an iris recognition mechanism, or a combination thereof. In some embodiments, the device comprises a temperature controller; in additional embodiments, the temperature controller comprises a heating apparatus or a cooling apparatus. In some embodiments, the temperature controller maintains the cubby in a temperature based on a type of the product.

In another aspect, disclosed is a device for delivering a product, the device comprising: a digital signal processor, a memory module and a network interface; a cabinet comprising a cubby and a front door, wherein the front door comprises a digital screen; and one or more sensors located in the cubby and configured to monitor an interior space of the cubby. In some embodiments, the network interface is configured to receive instructions from a computing device to configure the digital screen. In some embodiments, the digital screen comprises an LED light. In some embodiments, the digital screen comprises a transparent LED light. In some embodiments, the digital screen is configured to display data or indicia, such as a dynamic brand graphic, when the one or more sensors detect that the cubby is vacant. In some embodiments, the digital screen is configured to go dark when the one or more sensors detect that a prepared meal is being loaded to the cubby. Additionally or alternatively, the digital screen is configured to go dark when the associated cubby, which was previously not allocated to a particular order, is assigned to a particular order, for example using the environment manager program (FIG. 14). Embodiments are not required to have sensors in the cubby and embodiments can omit sensors within the cubby so that the internal state of the environment manager program combined with external input from sources other than the internal volume of the cubby may be programmed as the basis of decisions about state changes for the digital screen. In some embodiments, the digital screen is configured to go clear, so that the product in the cubby is visible through the front door and digital screen, when the one or more sensors detect that a prepared meal is placed in the cubby. Additionally or alternatively, the digital screen is configured to go clear, so that the product in the cubby is visible through the front door and digital screen, in response to input from a switch or pushbutton that is mounted at the back of the cubby and operated by a worker, or in response to a signal over the local area network from the environment manager program. In some embodiments, the digital screen is configured to display an order number when the one or more sensors detect that a prepared meal is placed in the cubby. In some embodiments, the digital screen is configured to display a name of an individual when the one or more sensors detect that a prepared meal is placed in the cubby. In some embodiments, the digital screen is configured to allow an individual to activate a mechanism of opening the front door. In some embodiments, the front door is configured to automatically open upon the individual correctly activating a mechanism of opening the front door. In some embodiments, the front door is configured to automatically close and the digital screen is configured to display a message when the one or more sensors detect that a prepared meal has been retrieved by an individual. In some embodiments, the digital screen is configured to display a message when the one or more sensors detect that a prepared meal has been retrieved by an individual. In some embodiments, the cubby comprises a light source positioned near the front door of the cubby, and a light detection device such as a photocell that is aligned to detect an interruption of light from the light source near the front door; the environment manager program may be programmed to cause the front door of the cubby to remain open for a programmed period of time in response to detecting an interruption of light from the light source, which could occur when a hand or device is extended into the cubby to retrieve the prepared meal or product. In such an embodiment, the programmed period of time may reset if the environment manager program detects another interruption of the light from the light source.

In another aspect, a computing system for presenting a food menu comprises: a digital processing device comprising a processor, a memory module and an operating system configured to perform executable instructions; and a computer readable medium storing instructions executed by the digital processing device to provide an application comprising a software module that is configured to provide a digital menu. In some embodiments, the digital menu comprises a plurality of food ingredients and a meal may be defined based on user input by assembling two or more food ingredients graphically using the digital menu. In some embodiments, the digital menu is personalized to an individual based on a preference. In some embodiments, the digital menu is personalized to the individual based on historical orders of the individual. In some embodiments, the digital menu is personalized to the individual based on a time. In some embodiments, the digital menu is personalized to the individual based on a month. In some embodiments, the digital menu is personalized to the individual based on a holiday. In some embodiments, the digital menu is personalized to the individual based on a season. In some embodiments, the digital menu is personalized to the individual based on an event.

In another aspect, disclosed herein is a computing system for an individual to order meals, the system comprising: a digital processing device comprising a processor, a memory module and an operating system configured to perform executable instructions; a digital screen; a computer readable medium storing instructions executed by the digital processing device to provide an application, the application comprising a software module configured to provide an interface to place a meal order. In some embodiments, the interface comprises a plurality of meals. In some embodiments, the interface comprises a plurality of food ingredients and is programmed to receive user input specifying two or more ingredients to be assembled into a meal. In some embodiments, the interface comprises a display a pickup location. In some embodiments, the pickup location is a nearest restaurant location. In some embodiments, the pickup location is determined by retrieving a current location of the individual. In some embodiments, the pickup location is based on analyzing a distance between a current location of the individual and a restaurant. In some embodiments, the pickup location is based on analyzing a distance between a current location of the individual and a preparation site. In some embodiments, the distance comprises a driving distance. In some embodiments, the distance comprises a walking distance. In some embodiments, the distance comprises a straight-line distance. In some embodiments, the interface comprises a preparation status of the meal order. In some embodiments, the interface comprises a remaining preparation time of the meal order. In some embodiments, the interface comprises an alert when preparation of the meal order is complete.

In another aspect, a computing system for assisting a restaurant to prepare meals comprises a digital processing device comprising a processor, a memory module and an operating system configured to perform executable instructions; a digital screen; a network interface; a computer readable medium storing instructions executed by the digital processing device to provide an application, the application comprising: a software module configured to receive a plurality of meal orders and to intelligently queue the plurality of meal orders, and a software module configured to provide a restaurant staff with guidance for preparing a meal order. In some embodiments, the guidance for preparing the meal order comprises selecting ingredients of the meal order. In some embodiments, the guidance for preparing the meal order comprises quantity of ingredients. In some embodiments, the guidance for preparing the meal order comprises weights of ingredients. In some embodiments, the guidance for preparing the meal order comprises steps of adding ingredients. In some embodiments, the guidance for preparing the meal order comprises a container to hold the meal order. In some embodiments, the guidance for preparing the meal order comprises indicating a cabinet or a cubby to place the meal order. In some embodiments, the guidance for preparing the meal order comprises a check list of preparing the meal order. In some embodiments, the system further comprises a sensor to monitor a preparation status of the meal order. In some embodiments, the network interface is configured to send a preparation status of the meal order to a computing device for displaying the preparation status. In some embodiments, the network interface is configured to communicate with a cabinet or a cubby, the cabinet or the cubby being configured to display order information. In some embodiments, the order information comprises a name. In some embodiments, the order information comprises an order number. In some embodiments, the order information comprises a content of the meal order. In some embodiments, the order information comprises a mechanism of opening a front door of the cabinet or a cubby. In some embodiments, the order information comprises a mechanism of retrieving one or more meals of the meal order.

In another aspect, disclosed is a computing system for real-time fresh meal ordering and preparation, the system comprising: a digital processing device comprising a processor, a memory module and an operating system configured to perform executable instructions; and a computer readable medium storing instructions executed by the digital processing device to provide an application, the application comprising: a software module configured to provide an individual with an ordering interface to place a meal order; a software module configured to receive the meal order and locate a nearest pickup location or restaurant for meal preparation; a software module configured to provide a restaurant staff with guidance for preparing the meal order; and a software module configured to configure a cabinet to hold a prepared meal. In some embodiments, the ordering interface comprises displaying a menu. In some embodiments, the menu is a menu of prepared foods. In some embodiments, the menu is a menu of ingredients. In some embodiments, the menu is personalized to the individual based on a preference. In some embodiments, the menu is personalized to the individual based on historical orders of the individual. In some embodiments, the menu is personalized to the individual based on a time. In some embodiments, is personalized to the individual based on a month. In some embodiments, the menu is personalized to the individual based on a holiday, season or event. In some embodiments, the ordering interface is configured to allow the individual to select ingredients to create the meal. In some embodiments, the ordering interface comprises displaying a pickup location. In some embodiments, locating the nearest pickup location or restaurant comprises retrieving a current location of the individual. In some embodiments, locating the nearest pickup location or restaurant comprises analyzing a distance between the current location of the individual and a restaurant. In some embodiments, locating the nearest pickup location or restaurant comprises analyzing a distance between the current location of the individual and a preparation site. In some embodiments, the distance comprises a driving distance, a walking distance, a straight-line distance, or a combination thereof. In some embodiments, the guidance for preparing the meal order comprises ingredients of the meal. In some embodiments, the guidance for preparing the meal order comprises quantity of ingredients. In some embodiments, the guidance for preparing the meal order comprises weights of ingredients. In some embodiments, the guidance for preparing the meal order comprises a container for holding the prepared meal. In some embodiments, the guidance for preparing the meal order comprises indicating the cabinet to hold the prepared meal. In some embodiments, the cabinet comprises a digital screen. In some embodiments, the digital screen is configured to display data or indicia, such as a dynamic brand graphic, when the cabinet is vacant. In some embodiments, digital screen is configured to display data or indicia, such as a dynamic brand graphic, when the cabinet is vacant. In some embodiments, the digital screen is configured to go dark when the restaurant staff is loading the prepared meal. In some embodiments, the digital screen is configured to go clear, so that the product in the cubby is visible through the front door and digital screen, when the prepared meal is securely in place. In some embodiments, the digital screen is configured to display an order number when the prepared meal is securely in place. In some embodiments, the digital screen is configured to display a name of the individual when the prepared meal is securely in place. In some embodiments, the digital screen is configured to allow the individual to activate an opening mechanism. In some embodiments, the digital screen is configured to automatically open a front door upon the individual correctly activating an opening mechanism. In some embodiments, the digital screen is configured to detect that the prepared meal has been retrieved by the individual. In some embodiments, the application further comprises a database. In some embodiments, the database is configured to store historical meal orders. In some embodiments, the database is configured to store current supply of raw food materials. In some embodiments, the database is configured to store individual preferences. In some embodiments, the database is configured to store individual preferences. In some embodiments, the application further comprises a software module to perform prediction. In some embodiments, the prediction comprises prediction of a demand of the individual. In some embodiments, the prediction comprises predicting a preference of the individual. In some embodiments, the prediction comprises predicting a supply of a raw food material. In some embodiments, the prediction is performed based on a preference. In some embodiments, the prediction is performed based on historical data. In some embodiments, the prediction is performed based on a time. In some embodiments, the prediction is performed based on a month. In some embodiments, the prediction is performed based on a holiday. In some embodiments, the prediction is performed based on a season. In some embodiments, the prediction is performed based on an event.

In another aspect, one or more non-transitory computer-readable storage media are encoded with a computer program including instructions executable by a processor to create an application for log data analysis and deduplication, the application comprising: a software module configured to provide an individual with an ordering interface to place a meal order; a software module configured to receive the meal order and locate a nearest pickup location or restaurant for meal preparation; a software module configured to provide a restaurant staff with guidance for preparing the meal order; and a software module configured to configure a cabinet to hold a prepared meal. In some embodiments, the ordering interface comprises displaying a menu. In some embodiments, the menu comprises a menu of prepared foods. In some embodiments, the menu comprises a menu of ingredients. In some embodiments, the menu is personalized to the individual based on a preference. In some embodiments, the menu is personalized to the individual based on historical orders of the individual. In some embodiments, the menu is personalized to the individual based on a time. In some embodiments, the menu is personalized to the individual based on a month. In some embodiments, the menu is personalized to the individual based on a holiday. In some embodiments, the menu is personalized to the individual based on a season. In some embodiments, the menu is personalized to the individual based on an event. In some embodiments, the ordering interface is configured to allow the individual to select ingredients to create the meal. In some embodiments, the ordering interface comprises displaying a pickup location. In some embodiments, locating the nearest pickup location or restaurant comprises retrieving a current location of the individual. In some embodiments, locating the nearest pickup location or restaurant comprises analyzing a distance between the current location of the individual and a restaurant. In some embodiments, locating the nearest pickup location or restaurant comprises analyzing a distance between the current location of the individual and a preparation site. In some embodiments, the distance comprises a driving distance, a walking distance, a straight-line distance, or a combination thereof. In some embodiments, the guidance for preparing the meal order comprises ingredients of the meal. In some embodiments, the guidance for preparing the meal order comprises quantity of ingredients. In some embodiments, the guidance for preparing the meal order comprises weights of ingredients. In some embodiments, the guidance for preparing the meal order comprises a container for holding the prepared meal. In some embodiments, the guidance for preparing the meal order comprises indicating the cabinet to hold the prepared meal. In some embodiments, the cabinet comprises a digital screen. In some embodiments, the digital screen is configured to display data or indicia, such as a dynamic brand graphic, when the cabinet is vacant. In some embodiments, the digital screen is configured to display data or indicia, such as a dynamic brand graphic, when the cabinet is vacant. In some embodiments, the digital screen is configured to go dark when the restaurant staff is loading the prepared meal. In some embodiments, the digital screen is configured to go clear, so that the product in the cubby is visible through the front door and digital screen, when the prepared meal is securely in place. In some embodiments, the digital screen is configured to display an order number when the prepared meal is securely in place. In some embodiments, the digital screen is configured to display a name of the individual when the prepared meal is securely in place. In some embodiments, the digital screen is configured to allow the individual to activate an opening mechanism. In some embodiments, the digital screen is configured to automatically open a front door upon the individual correctly activating an opening mechanism. In some embodiments, the digital screen is configured to detect that the prepared meal has been retrieved by the individual. In some embodiments, the application further comprises a database. In some embodiments, the database is configured to store historical meal orders. In some embodiments, the database is configured to store current supply of raw food materials. In some embodiments, the database is configured to store individual preferences. In some embodiments, the database is configured to store individual preferences. In some embodiments, the application further comprises a software module to perform prediction. In some embodiments, the prediction comprises predicting a demand of the individual. In some embodiments, the prediction comprises predicting a preference of the individual. In some embodiments, the prediction comprises predicting a supply of a raw food material. In some embodiments, the prediction is performed based on a preference. In some embodiments, the prediction is performed based on historical. In some embodiments, the prediction is performed based on a time, a month, a season, an event, or a combination thereof.

The subject matter disclosed herein includes an order placement, preparation and delivery system. Applications of the subject matter include meal orders, food orders, and produce purchases. However, the applications can be extended to any product orders.

In one aspect, disclosed is a device for housing and delivering a product to a designated recipient, the device comprising: a digital signal processor, a memory module and a network interface; a cabinet comprising a cubby and a front door, wherein the front door comprises a digital screen; and one or more sensors located in the cubby and configured to monitor an interior space of the cubby. In some embodiments, the product comprises one or more meals, or one or more prepared meals, or one or more prepared products. In some embodiments, the cabinet further comprises a back door; in further embodiments, the product is placed in the cubby through the back door. In some embodiments, the network interface is configured to receive instructions from a computing device to configure the digital screen. In some embodiments, the cubby comprises an LED light; in additional embodiments, the LED light is used to illuminate the interior space of the cubby. In some embodiments, the digital screen comprises an LED light. In some embodiments, the digital screen comprises a transparent LED light. In some embodiments, the digital screen is configured to display data or indicia, such as a dynamic brand graphic, when the one or more sensors detect that the cubby is vacant. In some embodiments, the digital screen is configured to go dark when the one or more sensors detect that the product is being loaded to the cubby. In some embodiments, the digital screen is configured to go clear, so that the product in the cubby is visible through the front door and digital screen, when the one or more sensors detect that the product has been placed in the cubby. In some embodiments, the digital screen is configured to display an order number when the one or more sensors detect that the product has been placed in the cubby. In some embodiments, the digital screen is configured to display a name of an individual when the one or more sensors detect that the product has been placed in the cubby. In some embodiments, the digital screen is configured to allow an individual to activate a mechanism of opening the front door. In some embodiments, the front door is configured to automatically open upon the individual correctly activating a mechanism of opening the front door. In some embodiments, the front door is configured to automatically close and the digital screen is configured to display a message when the one or more sensors detect that the product has been retrieved by an individual. In some embodiments, the digital screen is configured to display a message when the one or more sensors detect that a prepared meal has been retrieved by an individual. In some embodiments, the device further comprises a laser shield located at a ceiling; in further embodiments, the laser shield is configured to detect an obstruction in a way of the front door when the front door is moving. In some cases, the obstruction comprises a hand. In some embodiments, the front door stops moving when the obstruction is detected. In some embodiments, the cabinet or the cubby is in a remote location away from a product preparation site; in further embodiments, the product preparation site comprises a restaurant, or a factory, or a food processing center, or a combination thereof. In some embodiments, the cabinet is movable. In some embodiments, the cubby is movable. In some embodiments, the cubby is secured by a cubby locking mechanism; in further embodiments, the cubby locking mechanism is unlocked by a key code, or by a biometric recognition mechanism. A biometric recognition mechanism comprises a facial recognition mechanism, or a finger print recognition mechanism, or a palm print recognition mechanism, or an iris recognition mechanism, or a combination thereof. In some embodiments, the device comprises a temperature controller; in additional embodiments, the temperature controller comprises a heating apparatus or a cooling apparatus. In some embodiments, the temperature controller maintains the cubby in a temperature based on a type of the product.

In another aspect, disclosed is a device for delivering a product, the device comprising: a digital signal processor, a memory module and a network interface; a cabinet comprising a cubby and a front door, wherein the front door comprises a digital screen; and one or more sensors located in the cubby and configured to monitor an interior space of the cubby. In some embodiments, the network interface is configured to receive instructions from a computing device to configure the digital screen. In some embodiments, the digital screen comprises an LED light. In some embodiments, the digital screen comprises a transparent LED light. In some embodiments, the digital screen is configured to display data or indicia, such as a dynamic brand graphic, when the one or more sensors detect that the cubby is vacant. In some embodiments, the digital screen is configured to go dark when the one or more sensors detect that a prepared meal is being loaded to the cubby. In some embodiments, the digital screen is configured to go clear, so that the product in the cubby is visible through the front door and digital screen, when the one or more sensors detect that a prepared meal is placed in the cubby. In some embodiments, the digital screen is configured to display an order number when the one or more sensors detect that a prepared meal is placed in the cubby. In some embodiments, the digital screen is configured to display a name of an individual when the one or more sensors detect that a prepared meal is placed in the cubby. In some embodiments, the digital screen is configured to allow an individual to activate a mechanism of opening the front door. In some embodiments, the front door is configured to automatically open upon the individual correctly activating a mechanism of opening the front door. In some embodiments, the front door is configured to automatically close and the digital screen is configured to display a message when the one or more sensors detect that a prepared meal has been retrieved by an individual. In some embodiments, the digital screen is configured to display a message when the one or more sensors detect that a prepared meal has been retrieved by an individual.

In another aspect, disclosed is a computing system for presenting a food menu, the system comprising: a digital processing device comprising a processor, a memory module and an operating system configured to perform executable instructions; and a computer readable medium storing instructions executed by the digital processing device to provide an application, the application comprising a software module configured to provide an individual with a digital menu. In some embodiments, the digital menu is created based on a food science. In some embodiments, the digital menu is created based on a culinary science. In some embodiments, the digital menu comprises a plurality of food ingredients and the individual is allowed to create a meal by assembling two or more food ingredients. In some embodiments, the digital menu is personalized to the individual based on a preference. In some embodiments, the digital menu is personalized to the individual based on historical orders of the individual. In some embodiments, the digital menu is personalized to the individual based on a time. In some embodiments, the digital menu is personalized to the individual based on a month. In some embodiments, the digital menu is personalized to the individual based on a holiday. In some embodiments, the digital menu is personalized to the individual based on a season. In some embodiments, the digital menu is personalized to the individual based on an event.

In another aspect, disclosed herein is a computing system for an individual to order meals, the system comprising: a digital processing device comprising a processor, a memory module and an operating system configured to perform executable instructions; a digital screen; a computer readable medium storing instructions executed by the digital processing device to provide an application, the application comprising a software module configured to provide an individual with an interface to place a meal order. In some embodiments, the interface comprises a plurality of meals. In some embodiments, the interface comprises a plurality of food ingredients and allows the individual to assemble two or more ingredients into a meal. In some embodiments, the interface comprises a display a pickup location. In some embodiments, the pickup location is a nearest restaurant location. In some embodiments, the pickup location is determined by retrieving a current location of the individual. In some embodiments, the pickup location is based on analyzing a distance between a current location of the individual and a restaurant. In some embodiments, the pickup location is based on analyzing a distance between a current location of the individual and a preparation site. In some embodiments, the distance comprises a driving distance. In some embodiments, the distance comprises a walking distance. In some embodiments, the distance comprises a straight-line distance. In some embodiments, the interface comprises a preparation status of the meal order. In some embodiments, the interface comprises a remaining preparation time of the meal order. In some embodiments, the interface comprises an alert when preparation of the meal order is complete.

In another aspect, disclosed is a computing system for assisting a restaurant to prepare meals, the system comprising: a digital processing device comprising a processor, a memory module and an operating system configured to perform executable instructions; a digital screen; a network interface; a computer readable medium storing instructions executed by the digital processing device to provide an application, the application comprising: a software module configured to receive a plurality of meal orders and to intelligently queue the plurality of meal orders, and a software module configured to provide a restaurant staff with guidance for preparing a meal order. In some embodiments, the guidance for preparing the meal order comprises selecting ingredients of the meal order. In some embodiments, the guidance for preparing the meal order comprises quantity of ingredients. In some embodiments, the guidance for preparing the meal order comprises weights of ingredients. In some embodiments, the guidance for preparing the meal order comprises steps of adding ingredients. In some embodiments, the guidance for preparing the meal order comprises a container to hold the meal order. In some embodiments, the guidance for preparing the meal order comprises indicating a cabinet or a cubby to place the meal order. In some embodiments, the guidance for preparing the meal order comprises a check list of preparing the meal order. In some embodiments, the system further comprises a sensor to monitor a preparation status of the meal order. In some embodiments, the network interface is configured to send a preparation status of the meal order to a computing device for displaying the preparation status. In some embodiments, the network interface is configured to communicate with a cabinet or a cubby, the cabinet or the cubby being configured to display order information. In some embodiments, the order information comprises an individual name. In some embodiments, the order information comprises an order number. In some embodiments, the order information comprises a content of the meal order. In some embodiments, the order information comprises a mechanism of opening a front door of the cabinet or a cubby. In some embodiments, the order information comprises a mechanism of retrieving one or more meals of the meal order.

In another aspect, disclosed is a computing system for real-time fresh meal ordering and preparation, the system comprising: a digital processing device comprising a processor, a memory module and an operating system configured to perform executable instructions; and a computer readable medium storing instructions executed by the digital processing device to provide an application, the application comprising: (1) a software module configured to provide an individual with an ordering interface to place a meal order; (2) a software module configured to receive the meal order and locate a nearest pickup location or restaurant for meal preparation; (3) a software module configured to provide a restaurant staff with guidance for preparing the meal order; and (4) a software module configured to configure a cabinet to hold a prepared meal. In some embodiments, the ordering interface comprises displaying a menu. In some embodiments, the menu is a menu of prepared foods. In some embodiments, the menu is a menu of ingredients. In some embodiments, the menu is personalized to the individual based on a preference. In some embodiments, the menu is personalized to the individual based on historical orders of the individual. In some embodiments, the menu is personalized to the individual based on a time. In some embodiments, is personalized to the individual based on a month. In some embodiments, the menu is personalized to the individual based on a holiday. In some embodiments, the menu is personalized to the individual based on a season. In some embodiments, the menu is personalized to the individual based on an event. In some embodiments, the ordering interface is configured to allow the individual to select ingredients to create the meal. In some embodiments, the ordering interface comprises displaying a pickup location. In some embodiments, locating the nearest pickup location or restaurant comprises retrieving a current location of the individual. In some embodiments, locating the nearest pickup location or restaurant comprises analyzing a distance between the current location of the individual and a restaurant. In some embodiments, locating the nearest pickup location or restaurant comprises analyzing a distance between the current location of the individual and a preparation site. In some embodiments, the distance comprises a driving distance, a walking distance, a straight-line distance, or a combination thereof. In some embodiments, the guidance for preparing the meal order comprises ingredients of the meal. In some embodiments, the guidance for preparing the meal order comprises quantity of ingredients. In some embodiments, the guidance for preparing the meal order comprises weights of ingredients. In some embodiments, the guidance for preparing the meal order comprises a container for holding the prepared meal. In some embodiments, the guidance for preparing the meal order comprises indicating the cabinet to hold the prepared meal. In some embodiments, the cabinet comprises a digital screen. In some embodiments, the digital screen is configured to display data or indicia, such as a dynamic brand graphic, when the cabinet is vacant. In some embodiments, digital screen is configured to display data or indicia, such as a dynamic brand graphic, when the cabinet is vacant. In some embodiments, the digital screen is configured to go dark when the restaurant staff is loading the prepared meal. In some embodiments, the digital screen is configured to go clear, so that the product in the cubby is visible through the front door and digital screen, when the prepared meal is securely in place. In some embodiments, the digital screen is configured to display an order number when the prepared meal is securely in place. In some embodiments, the digital screen is configured to display a name of the individual when the prepared meal is securely in place. In some embodiments, the digital screen is configured to allow the individual to activate an opening mechanism. In some embodiments, the digital screen is configured to automatically open a front door upon the individual correctly activating an opening mechanism. In some embodiments, the digital screen is configured to detect that the prepared meal has been retrieved by the individual. In some embodiments, the application further comprises a database. In some embodiments, the database is configured to store historical meal orders. In some embodiments, the database is configured to store current supply of raw food materials. In some embodiments, the database is configured to store individual preferences. In some embodiments, the database is configured to store individual preferences. In some embodiments, the application further comprises a software module to perform prediction. In some embodiments, the prediction comprises prediction of a demand of the individual. In some embodiments, the prediction comprises predicting a preference of the individual. In some embodiments, the prediction comprises predicting a supply of a raw food material. In some embodiments, the prediction is performed based on a preference. In some embodiments, the prediction is performed based on historical data. In some embodiments, the prediction is performed based on a time. In some embodiments, the prediction is performed based on a month. In some embodiments, the prediction is performed based on a holiday. In some embodiments, the prediction is performed based on a season. In some embodiments, the prediction is performed based on an event.

In another aspect, disclosed are non-transitory computer-readable storage media encoded with a computer program including instructions executable by a processor to create an application for log data analysis and deduplication, the application comprising: a software module configured to provide an individual with an ordering interface to place a meal order; a software module configured to receive the meal order and locate a nearest pickup location or restaurant for meal preparation; a software module configured to provide a restaurant staff with guidance for preparing the meal order; and a software module configured to configure a cabinet to hold a prepared meal. In some embodiments, the ordering interface comprises displaying a menu. In some embodiments, the menu comprises a menu of prepared foods. In some embodiments, the menu comprises a menu of ingredients. In some embodiments, the menu is personalized to the individual based on a preference. In some embodiments, the menu is personalized to the individual based on historical orders of the individual. In some embodiments, the menu is personalized to the individual based on a time. In some embodiments, the menu is personalized to the individual based on a month. In some embodiments, the menu is personalized to the individual based on a holiday. In some embodiments, the menu is personalized to the individual based on a season. In some embodiments, the menu is personalized to the individual based on an event. In some embodiments, the ordering interface is configured to allow the individual to select ingredients to create the meal. In some embodiments, the ordering interface comprises displaying a pickup location. In some embodiments, locating the nearest pickup location or restaurant comprises retrieving a current location of the individual. In some embodiments, locating the nearest pickup location or restaurant comprises analyzing a distance between the current location of the individual and a restaurant. In some embodiments, locating the nearest pickup location or restaurant comprises analyzing a distance between the current location of the individual and a preparation site. In some embodiments, the distance comprises a driving distance, a walking distance, a straight-line distance, or a combination thereof. In some embodiments, the guidance for preparing the meal order comprises ingredients of the meal. In some embodiments, the guidance for preparing the meal order comprises quantity of ingredients. In some embodiments, the guidance for preparing the meal order comprises weights of ingredients. In some embodiments, the guidance for preparing the meal order comprises a container for holding the prepared meal. In some embodiments, the guidance for preparing the meal order comprises indicating the cabinet to hold the prepared meal. In some embodiments, the cabinet comprises a digital screen. In some embodiments, the digital screen is configured to display data or indicia, such as a dynamic brand graphic, when the cabinet is vacant. In some embodiments, the digital screen is configured to display data or indicia, such as a dynamic brand graphic, when the cabinet is vacant. In some embodiments, the digital screen is configured to go dark when the restaurant staff is loading the prepared meal. In some embodiments, the digital screen is configured to go clear, so that the product in the cubby is visible through the front door and digital screen, when the prepared meal is securely in place. In some embodiments, the digital screen is configured to display an order number when the prepared meal is securely in place. In some embodiments, the digital screen is configured to display a name of the individual when the prepared meal is securely in place. In some embodiments, the digital screen is configured to allow the individual to activate an opening mechanism. In some embodiments, the digital screen is configured to automatically open a front door upon the individual correctly activating an opening mechanism. In some embodiments, the digital screen is configured to detect that the prepared meal has been retrieved by the individual. In some embodiments, the application further comprises a database. In some embodiments, the database is configured to store historical meal orders. In some embodiments, the database is configured to store current supply of raw food materials. In some embodiments, the database is configured to store individual preferences. In some embodiments, the database is configured to store individual preferences. In some embodiments, the application further comprises a software module to perform prediction. In some embodiments, the prediction comprises predicting a demand of the individual. In some embodiments, the prediction comprises predicting a preference of the individual. In some embodiments, the prediction comprises predicting a supply of a raw food material. In some embodiments, the prediction is performed based on a preference. In some embodiments, the prediction is performed based on historical. In some embodiments, the prediction is performed based on a time, a month, a season, an event, or a combination thereof.

2. Example Implementation Environment

FIG. 1 presents an example computer system with which an embodiment may be implemented. In an embodiment, FIG. 1 represents the technical environment within a restaurant, which consists of a product preparation area, and a separate ordering and pickup area which, in some embodiments, also may be used for consumption of food. In an embodiment, the product preparation area is separated from the ordering and pickup area by a plurality of compartments termed cubbies that serve to temporarily hold, display and segregate finished meals. In one embodiment, the cubbies are formed as cubical or rectilinear compartments having a rear door, sides, top wall, bottom wall, and front door. In an embodiment, a large number of cubbies are organized in a stack or array and set into a solid, opaque wall that separates the product preparation area from the ordering and pickup area.

As explained further in detail in other sections, in one embodiment, the foregoing environment supports a product ordering, manufacturing, delivery and consumption process that generally comprises: a customer orders an item using a customer ordering touchpoint; the customer order is transmitted to the product preparation area; the product is made to order in response to receiving the customer order, and one of the cubbies is temporarily uniquely assigned to the customer order; the completed product is checked in one or more quality control steps; the completed product is placed in the designated cubby; the customer is notified either via a display integral to the cubby, or using a mobile computing device or other display; the customer obtains the product from the designated cubby and consumes the product.

Customer ordering touchpoints 101 comprise computing devices such as a desktop computer, mobile computing device, smartphone, or tablet computer, and are used for an individual (for example, a purchaser, a customer, or a consumer) to order a product (for example, a meal). Each such device is programmed to display a list of products or a menu of meals or a menu of ingredients to the individual. The individual interacts with the touchpoints 101 to make selections and place orders.

In an embodiment, a second computing device 102 hosts a concierge application, which serves as a virtual assistant to handle any problems (for example, refund, discount, etc.) that the individual or customer encounters.

When an individual or customer places an order, the order is sent to an environment manager 103 which implements an intelligent order queue in a computing system. In general, orders from different customers are queued sequentially. However, the environment manager 103 comprises an intelligent module to queue the orders based on a variety of factors. Example factors include the number of products in a single order, distance from the customer's current location to the pickup location, preparation time of individual products, a time of the day, and etc. In some conditions, the orders are not queued one by one, but the products of the entire orders are queued. Alternatively, the queuing is based on individual steps in product preparations, rather than based on products or orders.

Environment manager 103 is coupled with a digital display screen of an assembly station 104 at which order preparation is performed. In an embodiment, the assembly station 104 shows the instructions for a staff member to perform actions or steps involved in product assembly. During preparation of an order, an expediting station 105 shows instructions or check lists relating to quality control for an order.

Once an order is complete, the prepared product(s) are transferred to a cubby, which guarantees delivery of the product(s) to the designated recipient and, if applicable, preserves freshness of foods. In an embodiment, a large number of cubbies are co-located, and a food delivery application having an output display 106 identifies a customer and a cubby location, which is also transmitted to a mobile computing device associated with the customer. Thus, data relevant to the customer can be shown on a digital screen of the cubby. Non-limiting examples of the data to be displayed include an order number, customer's name, or a content of an order.

The transfer of product to a particular cubby is done manually, automatically by a conveyor belt, or automatically by a robot. When a cubby is in a remote location, the prepared product(s) are moved to the cubby using a transportation means. The location of a particular cubby for picking up products is determined and displayed to the customer when the products were ordered. Alternatively, the location of cubby is determined during the product preparation process, and the customer is alerted the location via a message.

Each cubby comprises a wireless or wired network interface to communicate with the environment manager 105 in an order preparation site. In some designs, the cubby is able to communicate with an ordering touchpoint 101, or a virtual assistant implemented at the second computing device 102, or an assembly station 104.

Figure 2A:
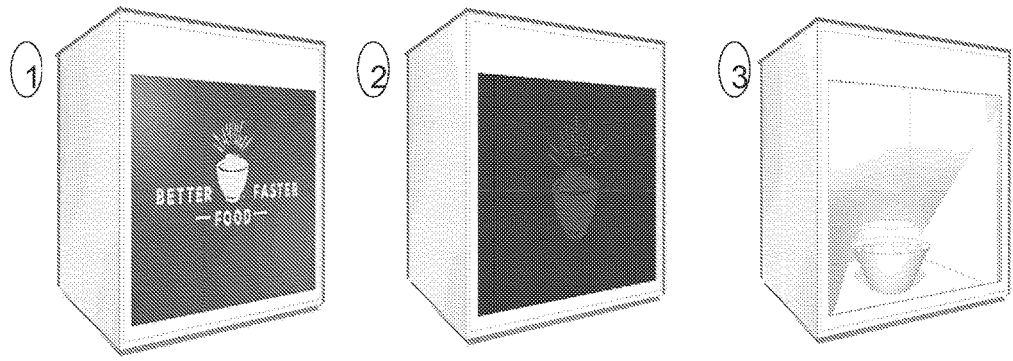
FIG. 2A illustrates an example cubby housing a product for a designated recipient.
Figure 2A:
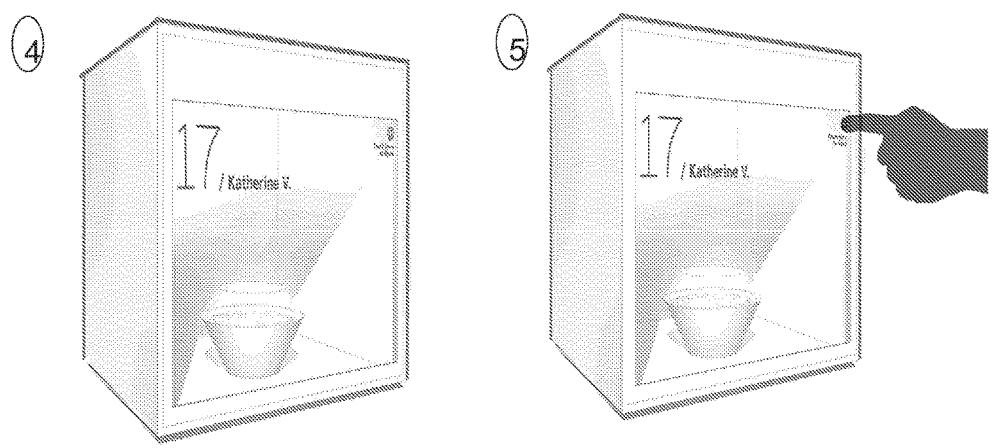
Figure 2B:
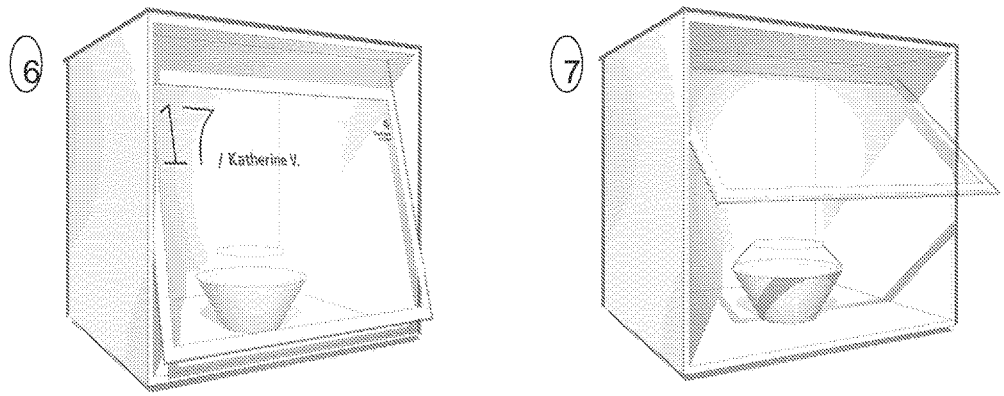
FIG. 2B illustrates an example cubby for a recipient retrieving a product.
Figure 2B:
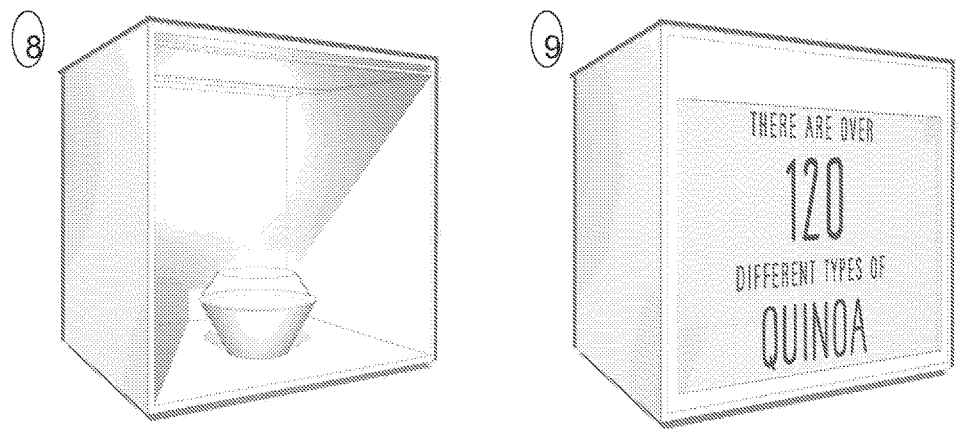

FIG. 2A and FIG. 2B present an example cubby and its appearance during operation as illustrated via numbered steps. In this example, the cubby is used for housing a prepared meal, but the cubby can house any product. Each cubby is equipped with a lighting system and digital screen that are individually capable of selection and driving to different states using the computer system described above.

Referring first to FIG. 2A, each cubby comprises a front door with a digital screen. The digital screen may be mounted in, set into, or otherwise affixed in association with the front door of the cubby as an integral part of the front door. In Step 1, the digital screen is configured to display data or indicia, such as a dynamic brand graphic, when the cubby is vacant. The display may be static, animated, black-and-white, or color. At this point, the front door may be locked or inactive so that it cannot be opened from the customer side of the premises. In addition, at this stage, the cubby may be a non-allocated state, as reflected in stored digital data that is managed by the environment manager program (FIG. 14) or environment manager (FIG. 1). For example, these systems may maintain, in digital data storage or memory, a stored cubby state table that maps unique identifiers of each particular cubby to state values, order or product identifiers, and other metadata. Initially a particular cubby may be marked in the cubby state table as Unallocated, or with an equivalent indicator, to specify that the particular cubby is not then currently associated with a particular order for a product. Thereafter, when a particular order for a product is received, manufactured, and completed, the environment manager program may be used to assign an available cubby to the product or order and to update the cubby state table to store a product identifier, order identifier or other value in association with a particular cubby identifier. Or, in some embodiments, the cubby state table may be updated with a flag value indicating Allocated or an equivalent state. In some embodiments, the environment manager program is programmed, in response to an internal change in memory or storage state as reflected in the cubby state table, to drive the display screen of that cubby to a different state (dark or light) or to generate and cause displaying particular indicia on the digital screen that is integrated into the front door of the allocated or assigned cubby.

In Step 2, the digital screen is configured to go dark before or during loading a prepared product into the cubby. "Go dark" may mean, in various embodiments, to turn off, to be driven to a dark color state, or to turn opaque; in any such embodiment, a dark screen means that the interior of the cubby cannot be viewed by a customer but may be illuminated to and visible by other persons who are located in the product preparation area. In this state, the front door remains locked or inactivated and not capable of opening, but the rear door can be opened at any time to place a product in the cubby from the product preparation area. Loading the cubby with a product typically occurs from the rear, and is performed by product preparation personnel who are separated from users are customers by the plurality of adjacent cubbies. In this manner, loading the cubby is an operation that is typically not visible to customers. In some embodiments, the digital screen is configured to go dark when the one or more sensors detect that a prepared meal is being loaded to the cubby. Additionally or alternatively, the digital screen is configured to go dark when the associated cubby, which was previously not allocated to a particular order, is assigned to a particular order, for example using the environment manager program (FIG. 14). Embodiments are not required to have sensors in the cubby and embodiments can omit sensors within the cubby so that the internal state of the environment manager program combined with external input from sources other than the internal volume of the cubby may be programmed as the basis of decisions about state changes for the digital screen.

In Step 3, the digital screen is configured to go clear, so that the product in the cubby is visible through the front door and digital screen, when a prepared product is placed in the cubby. This step permits a customer to see that a completed product has been placed in the cubby and is ready for pickup. In some embodiments, the digital screen is configured to go clear, so that the product in the cubby is visible through the front door and digital screen, when the one or more sensors detect that a prepared meal is placed in the cubby. Additionally or alternatively, the digital screen is configured to go clear, so that the product in the cubby is visible through the front door and digital screen, in response to input from a switch or pushbutton that is mounted at the back of the cubby and operated by a worker, or in response to a signal over the local area network from the environment manager program.

In Step 4, the digital screen is configured to display an order number or a name when a prepared product is placed in the cubby.

In Step 5, the digital screen is configured to allow an individual to activate opening the front door. Referring now to FIG. 2B, in Steps 6 and 7, the front door is configured to automatically open upon the individual correctly activating a mechanism of opening the front door. The activation is based on a touch screen. As an example, activating the front door may comprise entering an order number, order code, customer identifier, or other data using touch screen controls that are displayed on the display screen.

In some embodiments, the front door is configured to automatically close and the digital screen is configured to display a message when the one or more sensors detect that a prepared meal has been retrieved by an individual. In some embodiments, the digital screen is configured to display a message when the one or more sensors detect that a prepared meal has been retrieved by an individual. In some embodiments, the cubby comprises a light source positioned near the front door of the cubby, and a light detection device such as a photocell that is aligned to detect an interruption of light from the light source near the front door; the environment manager program may be programmed to cause the front door of the cubby to remain open for a programmed period of time in response to detecting an interruption of light from the light source, which could occur when a hand or device is extended into the cubby to retrieve the prepared meal or product. In such an embodiment, the programmed period of time may reset if the environment manager program detects another interruption of the light from the light source.

In Step 8, when the front door completely opens, the individual can retrieve the prepared product. In Step 9, the front door is configured to automatically close and the digital screen is configured to display a message (for example, an advertisement, a thank you note, etc.) when the prepared product has been removed.

Figure 3:
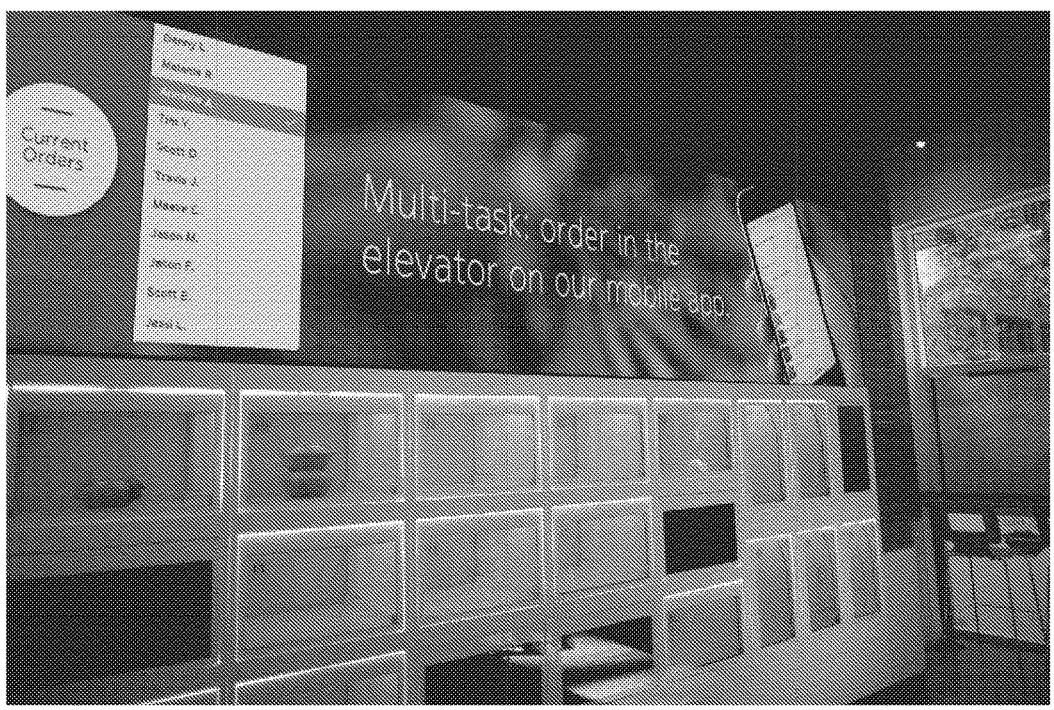
FIG. 3 illustrates an example cabinet of cubbies installed on a wall of a restaurant.

FIG. 3 illustrates an example interior space of a retail establishment such as a restaurant. In an embodiment, a cabinet installed on a wall of a restaurant comprises a plurality of cubbies of different sizes to hold various sizes of meals.

Figure 4:
FIG. 4 illustrates a close view of an example cubby that was holding two bowls and was in a landscape position.

FIG. 4 shows a close view of a cubby, which was holding two bowls and has a horizontally elongated or landscape orientation.

Figure 5:
FIG. 5 illustrates a close view of an example cubby that was empty and was in a portrait position.

FIG. 5 shows a close view of a cubby that is empty and has a vertically elongated or portrait orientation.

Figure 6:
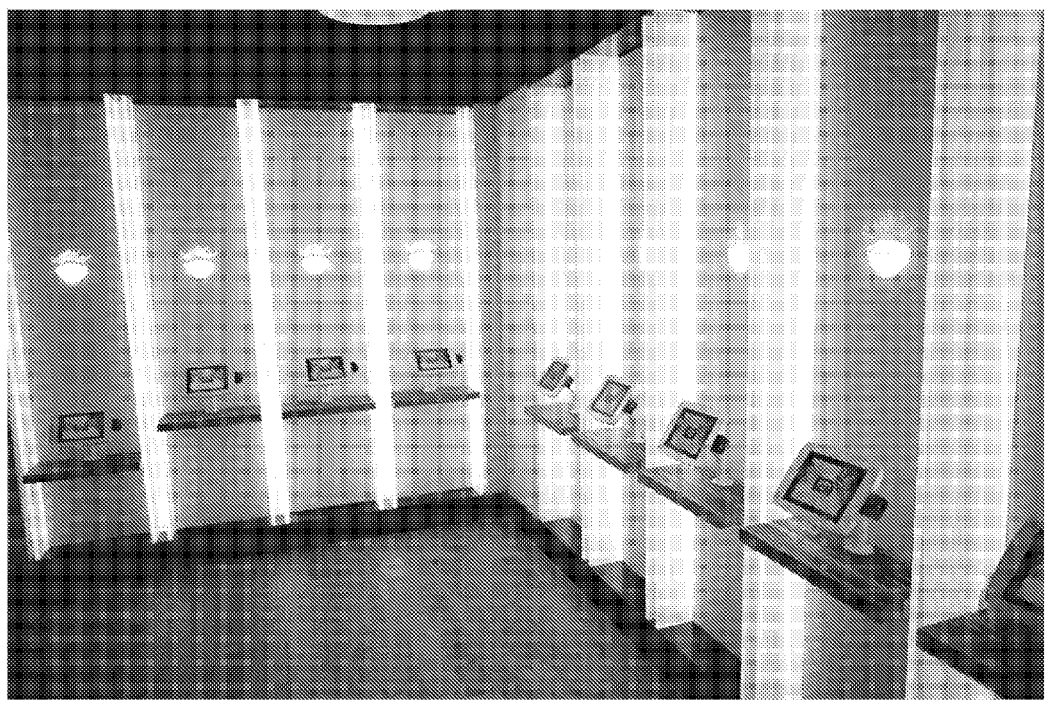
FIG. 6 illustrates a number of example kiosks installed in an example restaurant.

FIG. 6 shows a number of kiosks installed in an example restaurant. Each kiosk comprises a digital processing device; a digital screen; a computer readable medium storing instructions executed by the digital processing device to provide an application for an individual to place a meal order.

Figure 7:
FIG. 7 illustrates a different view of the example kiosks.
Figure 8:
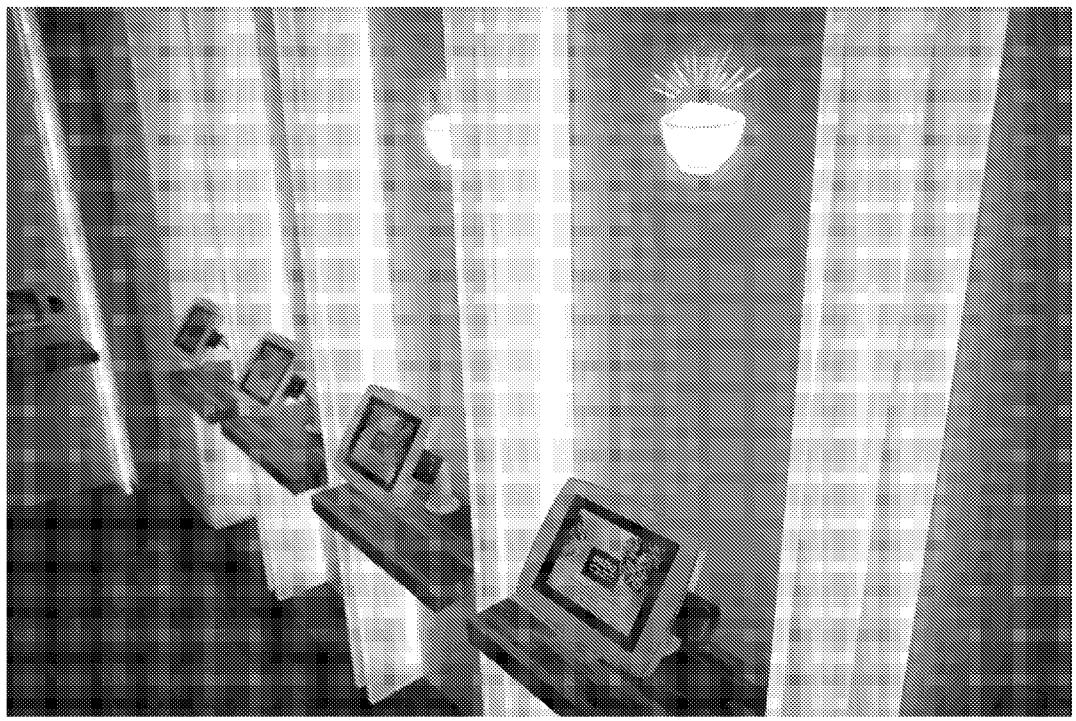
FIG. 8 illustrates a different view of the example kiosks.

FIG. 7 and FIG. 8 show different views of the kiosks.

Figure 9:
FIG. 9 illustrates an example software interface for meal ordering to create a bowl.

FIG. 9 shows a software interface, where an individual were able to place an order. In this example, the individual was allowed to create a bowl. Options of a bowl included warm, cold, and green.

Figure 10:
FIG. 10 illustrates example options to personalize an example bowl meal.

FIG. 10 shows further options to choose ingredients to personalize the bowl; in this example, options included veggies and fruits: roasted potato, spaghetti squash, cucumber, sauce, tomato, and carrots.

Figure 11:
FIG. 11 illustrates example options to personalize an example bowl meal and presentation of a name as the last navigational item that houses the personalized recommendations.

FIG. 11 shows additional options to personalize the meal; options in this example included chips, sides, and beverages.

Figure 12:
FIG. 12 illustrates an example of finalizing a meal order by swiping a credit card.

FIG. 12 shows that the individual finalized the meal order by swiping his credit card.

2.1 Meal Ordering Kiosk or App

In various embodiments, the system, method, network, device, and media described herein includes a meal ordering kiosk or app, or use of the same. A kiosk comprises a computing system for an individual to order products. In an embodiment, the computing system comprises a digital processing device comprising a processor, a memory module and an operating system configured to perform executable instructions; a digital screen; a computer readable medium storing instructions executed by the digital processing device to provide an application, the application comprising a software module configured to provide an individual with an interface to place an order.

Alternatively, a software application running on a computing device (for example, desktop, laptop, tablet, mobile computers, servers, smartphones, etc.) is designed for placing orders. The software application comprises an interface for an individual to place an order.

For illustrating the functionalities of the technologies, the following uses meal or food order as an example, but the technologies can be extended to any product orders.

In some embodiments, an interface comprises a digital menu; the digital menu comprises a plurality of meals. In some embodiments, an interface comprises a plurality of food ingredients and allows the individual to assemble two or more ingredients into a meal.

In some embodiments, an interface comprises a display a pickup location. In some embodiments, a pickup location is a nearest site or a nearest restaurant location. A pickup location is determined by retrieving a current location of the individual. A pickup location is based on analyzing a distance between a current location of the individual and a restaurant. A pickup location is based on analyzing a distance between a current location of the individual and a pickup location. Examples of distance include a driving distance, a walking distance, a straight-line distance.

In some embodiments, an interface comprises displaying a preparation status of the meal order. In some designs, an interface comprises a remaining preparation time of the meal order. In some implementations, an interface comprises an alert when preparation of the meal order is complete.

2.2 Product Ordering Interface

In various embodiments, the system, method, network, device, and media described herein includes an interface for product ordering, or use of the same. Non-limiting examples of the device hosting the interface include a mobile phone, a computer, a smartphone, a mobile computing device, a tablet, a laptop, a server, and a kiosk. Non-limiting examples of the product include a meal, a prepared meal, a food, a raw material, produce, a prepared product, a purchase, and etc.

For illustrating the functionalities of the technologies, the following uses meal or food order as an example, but the technologies can be extended to any product orders.

In some embodiments, the interface comprises is configured to provide an individual with a digital menu or a list of products. There are various designs of the digital menu. In some applications, the digital menu is created based on food science and/or culinary science.

In various embodiments, the system allows an individual to create a personalized meal. For instance, a digital menu comprises a plurality of food ingredients and the individual is allowed to create a meal by assembling two or more food ingredients. In some embodiments, a digital menu is personalized to the individual based on a preference. In some embodiments, a digital menu is personalized to the individual based on historical orders of the individual. In some implementations, a digital menu is personalized to the individual based on a time, a month, a holiday, a season, an event, or a combination thereof.

In some embodiments, the system further comprises a software module configured to recognize arrival of the individual. The recognizing the arrival of the individual comprises facial recognition or biometric recognition.

2.3 Order Preparation System

In various embodiments, the system, method, network, device, and media described herein includes an order preparation system or platform, or use of the same. An order preparation system or platform is able to assist a product preparation site to prepare products. An example preparation site is a restaurant or factory and meals are example products. For purposes of illustrating a clear example, the following description uses meal or food order as an example, but the technologies can be extended to any product orders.

In some embodiments, an order preparation system or platform comprises a digital processing device comprising a processor, a memory module and an operating system configured to perform executable instructions; an optional digital screen; an optional network interface; a computer readable medium storing instructions executed by the digital processing device to provide an application, the application comprising: a software module configured to receive a plurality of meal orders and to intelligently queue the plurality of meal orders; and a software module configured to provide a restaurant staff with guidance for preparing a meal order.

In some embodiments, the guidance for preparing the meal order comprises selecting ingredients of the meal order. In some implementations, the guidance for preparing the meal order comprises quantity of ingredients. In some designs, the guidance for preparing the meal order comprises weights of ingredients. In various applications, the guidance for preparing the meal order comprises steps of adding ingredients.

Besides preparing foods, other guidance includes a container to hold the meal order, or a wrapping method to finish the meal. When a meal is prepared, keeping freshness of the prepared meal is important. Moreover, allowing the individual to easily pick up his meal is crucial as well. As such, in some embodiments the guidance for preparing the meal order comprises indicating a cabinet or a cubby to place the meal order.

In some embodiments, quality control is included in the system. For instance, the guidance for preparing the meal order comprises a check list of preparing the meal order. In some designs, the system further comprises a sensor to monitor quality or steps of food preparations.

Allowing an individual to monitor his or her meal order is included in the system. In some designs, the system utilizes check list to let restaurant staff to check progress. Alternatively, automatic system is designed, wherein the system comprises a sensor to monitor a preparation status of the meal order. A network interface is used to send a preparation status of the meal order to a computing device for displaying the preparation status.

In some implementations, a network interface is configured to communicate with a cabinet or a cubby, the cabinet or the cubby being configured to display order information. Various aspects can be included in the order information. Non-limiting examples of order information include an individual's name, a meal order number, a content of the meal order, a mechanism of opening a front door of the cabinet or a cubby, and a mechanism of retrieving one or more meals of the meal order.

2.4 Prediction

In various embodiments, the system, method, network, device, and media described herein includes a prediction module, or use of the same.

For illustrating the functionalities of the technologies, the following uses meal or food order as an example, but the technologies can be extended to any product orders.

In some embodiments, a prediction module is coupled with a database. A database is configured to store historical orders. In some designs, a database is configured to store current supply of raw materials. In some embodiments, a database is configured to store an individual's preferences. In additional embodiments, a database is configured to store an individual's preferences.

A software module to perform prediction comprises predicting a demand of an individual. In some embodiments, prediction comprises predicting a preference of the individual.

In some embodiments, prediction is performed based on indicated preference of an individual.

In some implementations, prediction includes predicting resources or food supply, such as raw food material, or both.

In additional embodiments, the system performs prediction based on a time, a month, a holiday, a season, an event, or a combination thereof.

2.5 Cabinet Housing and Delivering Products

In various embodiments, the system, method, network, device, and media described herein includes a cabinet, or use of the same. The cabinet is used to housing and delivering a product to a designated recipient. Non-limiting examples of the product include a meal, a prepared meal, a food, a raw material, a prepared product, a purchase, and etc.

In some embodiments, a cabinet comprises a digital signal processor, a memory module and a network interface. In some embodiments, a cabinet comprises a cubby and a front door, wherein the front door comprises a digital screen. In some embodiments, the cabinet further comprises a back door; in further embodiments, the product is placed in the cubby through the back door.

In some embodiments, one or more sensors are located in the cubby and configured to monitor an interior space of the cubby.

In some embodiments, the cabinet or the cubby is in a remote location away from a product preparation site; in further embodiments, the product preparation site comprises a restaurant, or a factory, or a food processing center, or a combination thereof.

In some designs, the digital screen comprises an LED light. In further designs, the digital screen comprises a transparent LED light. In some embodiments, an LED light is installed inside a cubby for illuminating an interior space of the cubby. The LED light installed inside the cubby creates necessary light for transparency feature of the LED screen.

In additional embodiments, a network interface of the cubby or cabinet is configured to receive instructions from a computing device to configure the digital screen. In some embodiments, the digital screen is configured to display data or indicia, such as a dynamic brand graphic, when the one or more sensors detect that the cubby is vacant. The digital screen is configured to go dark when the one or more sensors detect that a prepared meal is being loaded to the cubby. The digital screen is configured to go clear, so that the product in the cubby is visible through the front door and digital screen, when the one or more sensors detect that a prepared meal is placed in the cubby. The digital screen is configured to display an order number when the one or more sensors detect that a prepared meal is placed in the cubby. The digital screen is configured to display a name of an individual when the one or more sensors detect that a prepared meal is placed in the cubby.

To pick up the meal, a digital screen is configured to allow an individual to activate a mechanism of opening the front door. The front door is configured to automatically open upon the individual correctly activating a mechanism of opening the front door. The front door is configured to automatically close and the digital screen is configured to display a message when the one or more sensors detect that a prepared meal has been retrieved by an individual.

In some embodiments, the digital screen is configured to display a message when the one or more sensors detect that a prepared meal has been retrieved by an individual.

In some embodiments, the device further comprises a laser shield located at a ceiling; in further embodiments, the laser shield is configured to detect an obstruction in a way of the front door when the front door is moving. In some cases, the obstruction comprises a hand. In some embodiments, the front door stops moving when the obstruction is detected.

In some embodiments, the cabinet is movable. In some embodiments, the cubby is movable. In some embodiments, the cubby is secured by a cubby locking mechanism; in further embodiments, the cubby locking mechanism is unlocked by a key code, or by a biometric recognition mechanism. A biometric recognition mechanism comprises a facial recognition mechanism, or a finger print recognition mechanism, or a palm print recognition mechanism, or an iris recognition mechanism, or a combination thereof.

In some embodiments, the device comprises a temperature controller; in additional embodiments, the temperature controller comprises a heating apparatus or a cooling apparatus. In some embodiments, the temperature controller maintains the cubby in a temperature based on a type of the product.

FIG. 13 illustrates an example networked computer system with which an embodiment may be implemented. FIG. 14 illustrates a retail store environment, and networked computers within it, that may be used to implement an embodiment in coordination with the elements of FIG. 13. For purposes of illustrating a clear example, FIG. 13, FIG. 14 each illustrate single instances of various elements, but in other embodiments there may be multiple elements to provide added computing capacity or to accommodate more users such as customers.

Referring first to FIG. 13, in one embodiment, a plurality of application program instances 1320, 1322 execute in a cloud-based virtual computing environment or datacenter that may implement a REST application programming interface (API) 1312 to accept programmatic calls or parameterized URLs from other elements to which the instances are communicatively coupled. For purposes of illustrating a clear example, FIG. 13 shows representative instances 1320, 1322 of an application program, but in other embodiments there may be fewer or more instances and the number of instances may be dynamically instantiated or terminated (spun up or spun down) in response to changes in service levels, traffic volume, order volume, CPU capacity and the like. The datacenter may be in a shared co-location facility or other virtual computing environment. For example, application instances 1320, 1322 may execute in the AMAZON WEB SERVICES (AWS) virtual computing environment or a similar facility. In an embodiment, customer computers such as a web-based customer computer 1342 and a mobile customer computer 1344 communicate via a WWW services unit 1314 to the application instance 1320, using parameterized URLs that are transmitted using HTTP GET and POST requests and responses via HTTPS. Servicing such URLs, requests and responses may utilize cached data 1320 or real-time data streams that are served by a processing unit 1306 from a database back-end 1310.

The WWW services unit 1314 may comprise an application instance that is cloud hosted in the same facility as the application instances 1320, 1322 or a different facility. Cached data 1302 may represent data stores that are programmed to implement a REDIS cache, job queuing, and other functions. The database back-end 1310 may comprise a POSTGRES system, a two-tier data store based on HDFS for rapid data access and HADOOP for longer-lived data storage, or similar systems. The real-time stream data processing until 1306 may be based on SPARK or similar technology.

In an embodiment, application instances 1320, 1322 also are communicatively coupled to a payment gateway 1304 which is programmed to relay requests for payment into credit card and debit card networks or other payment networks such as PAYPAL, GOOGLE WALLET, APPLE PAY and the like. Using programmatic calls, the application instances 1320, 1322 can relay card payment details and transaction data from a kiosk (further discussed with FIG. 14) located in a product delivery location such as a retail store or restaurant.

In an embodiment, one or more service provider back office applications 1330 are communicatively coupled to the application instances 1320, 1322 via the REST API 1312. An operational user computer 1346 is coupled to the service provider back office applications 1330, which may be hosted in program instances that are executing in the cloud-based datacenter that also hosts instances 1320, 1322, and/or WWW services unit 1314. The service provider back office applications 1330 may be programmed to provide data analytics functions, transaction logging, customer device click event tracking, and similar functions. To accomplish customer click tracking, the web-based customer computer 1342 and mobile customer computer 1344 may be programmed with applications or apps that report user events, such as taps or clicks in user interface elements, via HTTP to a click-event service having a cached data store as part of the database back-end 1310. The cached click-event data later can be subjected to inspection or analytics functions using the service provider back office applications 1330.

In an embodiment, a set of store computers 1360, detailed in FIG. 14, are communicatively coupled via a publish-subscribe service API 1350 to the REST API 1312 and the application instances 1320, 1322.

Referring now to FIG. 14, in an embodiment, store computers 1360 of a retail store environment may comprise a house control system 1402 comprising one or more kiosks 1404 and one or more operations management consoles 1406. In an embodiment, the retail store environment comprises a secure wireless local area network that is coupled to house control system 1402, automated kitchen system 1430, cubby cabinet 1420, printers 1408, 1410, and display devices 1440, 1450. Kiosks 1404, of which there may be any number, may comprise a mobile computing device such as a tablet computer that executes an app programmed to display a menu, receive user input specifying items, dishes, meals and the like, receive payment data to pay for an item, dish or meal, and transmit and receive data from other elements of the system to communicate order details to the operations management consoles 1406 and environment manager program 1422, and to communicate payment data and payment confirmations to and from the systems of FIG. 13.

In an embodiment, the operations management console 1406 is programmed to provide front-of-house staff with a graphical user interface that displays open orders, order status, and other information. In an embodiment, the operations management console 1406 is coupled via the local area network to ticket printer 1408 and label printer 1410, and is programmed to drive the ticket printer 1408 to print tickets for use in a kitchen facility for preparation of food. Tickets may indicate, for example, a particular food order of a particular customer at a particular time. The operations management consoles 1406 also may be programmed to drive the label printer 1410 to print labels for affixing to finished products or their packaging, such as containers for meals.

In an embodiment, the operations management consoles 1406 are coupled to an automated kitchen system 1430 which may comprise one or more food assembly devices 1432 and one or more food quality control stations 1434. The food assembly devices 1432, in an embodiment, are programmed to automatically dispense cooked food ingredients onto or into a receptacle, such as a bowl or plate, in a programmed order and in programmed quantities, to yield a finished item, dish or meal. The food quality control stations 1434 are programmed to display ingredient identification, quantity, and order information using a digital display screen to assist an expediter or other quality control staff member to determine whether the finished item, dish or meal is correct.

In an embodiment, an environment manager program 1422 is communicatively coupled to the publish-subscribe service API 1350 (FIG. 13) and to the automated kitchen system 1430, a cubby cabinet 1420 having two or more cubbies 1422, 1424, an order status display device 1440 and optionally another display device 1450. In an embodiment, the environment manager program 1422 is programmed to receive data specifying open orders from the operations management console 1406, and order status from automated kitchen system 1430, and to drive the order status display device 1440 to display data indicating a then-current status of various orders that are in process. The environment manager program 1422 also is programmed to execute the operations that have been previously described, and to drive the cubbies 1422, 1424, to cause illuminating or darkening the cubbies or their display screens, to activate or deactivate front doors of the cubbies, and to drive display of data or indicia on the display screens of the cubbies at specified times based on input from the automated kitchen system and the cubbies that indicates the status of an order, the status of opening or closing the rear door, and other physical state information.

In one embodiment, order status display device 1440 comprises a flat-panel color display that is driven by the environment manager program 1422 to display customer identifying information, such as a first name, and a then-current order status of orders associated with that customer, and to update the display from time to time as order status changes. Changes in order status may be received by notifications that are programmatically pushed from the operations management consoles and/or the automated kitchen system 1430 and/or the cubbies 1422, 1424. In an embodiment, the optional other display device 1450 is driven by the environment manager program 1422 to display menus, brand identity data, advertisements, promotions, community information, store staff information, and the like.

3. Implementation Example—Hardware and Software 3.1 Digital Processing Device In some embodiments, the platforms, systems, software applications, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU or Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

3.2 Non-Transitory Computer-Readable Storage Medium

In some embodiments, the platforms, systems, software applications, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

3.3 Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application is written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

3.4 Standalone Application

In some embodiments, a computer program includes a standalone application, which is a program that is run as an independent computer process, not an add-on to an existing process, for example, not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

3.5 Software Modules

In some embodiments, the platforms, systems, software applications, media, and methods disclosed herein include software, server, and/or database modules, or use of the same. In view of the disclosure provided herein, software modules are created by techniques known to those of skill in the art using known machines, software, and languages. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

3.6 Databases

In some embodiments, the platforms, systems, software applications, media, and methods disclosed herein include one or more databases, or use of the same. In view of the disclosure provided herein, those of skill in the art will recognize that many databases are suitable for storage and retrieval of network event data. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

4. Other Disclosure

The disclosure also encompasses the subject matter set forth in the following numbered clauses.

1. A device for housing and delivering a product to a designated recipient, the device comprising: a digital signal processor, a memory module and a network interface; a cabinet comprising a cubby and a front door, wherein the front door comprises a digital screen; and one or more sensors located in the cubby and configured to monitor an interior space of the cubby.

2. The device of clause 1, wherein the product comprises one or more meals.

3. The device of clause 1, wherein the product comprises one or more prepared meals.

4. The device of clause 1, wherein the product comprises one or more prepared products.

5. The device of clause 1, wherein the cabinet further comprises a back door.

6. The device of clause 5, wherein the product is placed in the cubby through the back door.

7. The device of clause 1, wherein the network interface is configured to receive instructions from a computing device to configure the digital screen.

8. The device of clause 1, wherein the cubby comprises an LED light.

9. The device of clause 8, wherein the LED light is used to illuminate the interior space of the cubby.

10. The device of clause 1, wherein the digital screen comprises an LED light.

11. The device of clause 1, wherein the digital screen comprises a transparent LED light.

12. The device of clause 1, wherein the digital screen is configured to display data or indicia, such as a dynamic brand graphic, when the one or more sensors detect that the cubby is vacant.

13. The device of clause 1, wherein the digital screen is configured to go dark when the one or more sensors detect that the product is being loaded to the cubby.

14. The device of clause 1, wherein the digital screen is configured to go clear, so that the product in the cubby is visible through the front door and digital screen, when the one or more sensors detect that the product has been placed in the cubby.

15. The device of clause 1, wherein the digital screen is configured to display an order number when the one or more sensors detect that the product has been placed in the cubby.

16. The device of clause 1, wherein the digital screen is configured to display a name of an individual when the one or more sensors detect that the product has been placed in the cubby.

17. The device of clause 1, wherein the digital screen is configured to allow an individual to activate a mechanism of opening the front door.

18. The device of clause 1, wherein the front door is configured to automatically open upon the individual correctly activating a mechanism of opening the front door.

19. The device of clause 1, wherein the front door is configured to automatically close and the digital screen is configured to display a message when the one or more sensors detect that the product has been retrieved by an individual.

20. The device of clause 1, wherein the digital screen is configured to display a message when the one or more sensors detect that a prepared meal has been retrieved by an individual.

21. The device of clause 1, further comprising a laser shield located at a ceiling.

22. The device of clause 21, wherein the laser shield is configured to detect an obstruction in a way of the front door when the front door is moving.

23. The device of clause 22, wherein the obstruction comprises a hand.

24. The device of clause 22, wherein the front door stops moving when the obstruction is detected.

25. The device of clause 1, wherein the cabinet or e cubby is in a remote location away from a product preparation site.

26. The device of clause 25, wherein the product preparation site comprises a restaurant.

27. The device of clause 25, wherein the product preparation site comprises a factory.

28. The device of clause 25, wherein the product preparation site comprises a food processing center.

29. The device of clause 1, wherein the cabinet is movable.

30. The device of clause 1, wherein the cubby is movable.

31. The device of clause 1, wherein the cubby is secured by a cubby locking mechanism.

32. The device of clause 31, wherein the cubby locking mechanism is unlocked by a key code.

33. The device of clause 31, wherein the cubby locking mechanism is unlocked by a biometric recognition mechanism.

34. The device of clause 31, wherein the cubby locking mechanism is unlocked by a facial recognition mechanism.

35. The device of clause 31, wherein the cubby locking mechanism is unlocked by a finger print recognition mechanism.

36. The device of clause 31, wherein the cubby locking mechanism is unlocked by a palm print recognition mechanism.

37. The device of clause 31, wherein the cubby locking mechanism is unlocked by an iris recognition mechanism.

38. The device of clause 1, further comprises a temperature controller.

39. The device of clause 38, wherein the temperature controller comprises a heating apparatus.

40. The device of clause 38, wherein the temperature controller comprises a cooling apparatus.

41. The device of clause 38, wherein the temperature controller maintains the cubby in a temperature based on a type of the product.

42. A computing system for presenting a food menu, the system comprising: a digital processing device comprising a processor, a memory module and an operating system configured to perform executable instructions; and a computer readable medium storing instructions executed by the digital processing device to provide an application, the application comprising a software module configured to provide an individual with a digital menu.

43. The system of clause 42, wherein the digital menu is created based on a food science.

44. The system of clause 42, wherein the digital menu is created based on a culinary science.

45. The system of clause 42, wherein the digital menu comprises a plurality of food ingredients and the individual is allowed to create a meal by assembling two or more food ingredients.

46. The system of clause 42, wherein the digital menu is personalized to the individual based on a preference.

47. The system of clause 42, wherein the digital menu is personalized to the individual based on historical orders of the individual.

48. The system of clause 42, wherein the digital menu is personalized to the individual based on a time.

49. The system of clause 42, wherein the digital menu is personalized to the individual based on a month.

50. The system of clause 42, wherein the digital menu is personalized to the individual based on a holiday.

51. The system of clause 42, wherein the digital menu is personalized to the individual based on a season.

52. The system of clause 42, wherein the digital menu is personalized to the individual based on an event.

53. A computing system for an individual to order meals, the system comprising: a digital processing device comprising a processor, a memory module and an operating system configured to perform executable instructions; a digital screen; a computer readable medium storing instructions executed by the digital processing device to provide an application, the application comprising a software module configured to provide an individual with an interface to place a meal order.

54. The system of clause 53, wherein the interface comprises a plurality of meals.

55. The system of clause 53, wherein the interface comprises a plurality of food ingredients and allows the individual to assemble two or more ingredients into a meal.

56. The system of clause 53, wherein the interface comprises a display a pickup location.

57. The system of clause 56, wherein the pickup location is a nearest restaurant location.

58. The system of clause 56, wherein the pickup location is determined by retrieving a current location of the individual.

59. The system of clause 56, wherein the pickup location is based on analyzing a distance between a current location of the individual and a restaurant.

60. The system of clause 56, wherein the pickup location is based on analyzing a distance between a current location of the individual and a preparation site.

61. The system of clause 59, wherein the distance comprises a driving distance.

62. The system of clause 59, wherein the distance comprises a walking distance.

63. The system of clause 59, wherein the distance comprises a straight-line distance.

64. The system of clause 53, wherein the interface comprises a preparation status of the meal order.

65. The system of clause 53, wherein the interface comprises a remaining preparation time of the meal order.

66. The system of clause 53, wherein the interface comprises an alert when preparation of the meal order is complete.

67. The system of clause 53, further comprising a software module configured to recognize arrival of the individual.

68. The system of clause 67, wherein the recognizing the arrival of the individual comprises facial recognition.

69. A computing system for assisting a restaurant to prepare meals, the system comprising: a digital processing device comprising a processor, a memory module and an operating system configured to perform executable instructions; a digital screen; a network interface; a computer readable medium storing instructions executed by the digital processing device to provide an application, the application comprising: a software module configured to receive a plurality of meal orders and to intelligently queue the plurality of meal orders; and a software module configured to provide a restaurant staff with guidance for preparing a meal order.

70. The system of clause 69, wherein the guidance for preparing the meal order comprises selecting ingredients of the meal order.

71. The system of clause 69, wherein the guidance for preparing the meal order comprises quantity of ingredients.

72. The system of clause 69, wherein the guidance for preparing the meal order comprises weights of ingredients.

73. The system of clause 69, wherein the guidance for preparing the meal order comprises steps of adding ingredients.

74. The system of clause 69, wherein the guidance for preparing the meal order comprises a container to hold the meal order.

75. The system of clause 69, wherein the guidance for preparing the meal order comprises indicating a cabinet or a cubby to place the meal order.

76. The system of clause 69, wherein the guidance for preparing the meal order comprises a check list of preparing the meal order.

77. The system of clause 69, further comprising a sensor to monitor a preparation status of the meal order.

78. The system of clause 69, wherein the network interface is configured to send a preparation status of the meal order to a computing device for displaying the preparation status.

79. The system of clause 69, wherein the network interface is configured to communicate with a cabinet or a cubby, the cabinet or the cubby being configured to display order information.

80. The system of clause 79, wherein the order information comprises an individual's name.

81. The system of clause 79, wherein the order information comprises an order number.

82. The system of clause 79, wherein the order information comprises a content of the meal order.

83. The system of clause 79, wherein the order information comprises a mechanism of opening a front door of the cabinet or a cubby.

84. The system of clause 79, wherein the order information comprises a mechanism of retrieving one or more meals of the meal order.

85. A computing system for real-time fresh meal ordering and preparation, the system comprising: a digital processing device comprising a processor, a memory module and an operating system configured to perform executable instructions; and a computer readable medium storing instructions executed by the digital processing device to provide an application, the application comprising: a software module configured to provide an individual with an ordering interface to place a meal order; a software module configured to receive the meal order and locate a nearest restaurant for meal preparation; a software module configured to provide a restaurant staff with guidance for preparing the meal order; and a software module configured to configure a cabinet to hold a prepared meal.

86. The system of clause 85, wherein the ordering interface comprises displaying a menu.

87. The system of clause 86, wherein the menu is a menu of prepared foods.

88. The system of clause 86, wherein the menu is a menu of ingredients.

89. The system of clause 86, wherein the menu is personalized to the individual based on a preference.

90. The system of clause 86, wherein the menu is personalized to the individual based on historical orders of the individual.

91. The system of clause 86, wherein the menu is persona zed to e individual based on a time.

92. The system of clause 86, wherein the menu is personalized to the individual based on a month.

93. The system of clause 86, ere in the menu is personalized to the individual based on a holiday.

94. The system of clause 86, wherein the menu is personalized to the individual based on a season.

95. The system of clause 86, wherein the menu is personalized to the individual based on an event.

96. The system of clause 85, wherein the ordering interface is configured to allow the individual to select ingredients to create the meal.

97. The system of clause 85, wherein the ordering interface comprises displaying a pickup location.

98. The system of clause 85, wherein the locating the nearest restaurant comprising retrieving a current location of the individual.

99. The system of clause 85, wherein the locating the nearest restaurant comprising analyzing a distance between the current location of the individual and a restaurant.

100. The system of clause 85, wherein the locating the nearest restaurant comprising analyzing a distance between the current location of the individual and a preparation site.

101. The system of clause 99, wherein the distance comprises a driving distance.

102. The system of clause 99, wherein the distance comprises a walking distance.

103. The system of clause 99, wherein the distance comprises a straight-line distance.

104. The system of clause 85, wherein the guidance for preparing the meal order comprises ingredients of the meal.

105. The system of clause 85, wherein the guidance for preparing the meal order comprises quantity of ingredients.

106. The system of clause 85, wherein the guidance for preparing the meal order comprises weights of ingredients.

107. The system of clause 85, wherein the guidance for preparing the meal order comprises a container for holding the prepared meal.

108. The system of clause 85, wherein the guidance for preparing the meal order comprises indicating the cabinet to hold the prepared meal.

109. The system of clause 85, wherein the cabinet comprises a digital screen.

110. The system of clause 109, wherein the digital screen is configured to display data or indicia, such as a dynamic brand graphic, when the cabinet is vacant.

111. The system of clause 109, wherein the digital screen is configured to display data or indicia, such as a dynamic brand graphic, when the cabinet is vacant.

112. The system of clause 109, wherein the digital screen is configured to go dark when the restaurant staff is loading the prepared meal.

113. The system of clause 109, wherein the digital screen is configured to go clear, so that the product in the cubby is visible through the front door and digital screen, when the prepared meal is securely in place.

114. The system of clause 109, wherein the digital screen is configured to display an order number when the prepared meal is securely in place.

115. The system of clause 109, wherein the digital screen is configured to display a name of the individual when the prepared meal is securely in place.

116. The system of clause 109, wherein the digital screen is configured to allow the individual to activate an opening mechanism.

117. The system of clause 109, wherein the digital screen is configured to automatically open a front door upon the individual correctly activating an opening mechanism.

118. The system of clause 109, wherein the digital screen is configured to detect that the prepared meal has been retrieved by the individual.

119. The system of clause 85, wherein the application further comprises a database.

120. The system of clause 119, wherein the database is configured to store historical meal orders.

121. The system of clause 119, wherein the database is configured to store current supply of raw food materials.

122. The system of clause 119, wherein the database is configured to store preferences of the individual.

123. The system of clause 119, wherein the database is configured to store interests of the individual.

124. The system of clause 85, wherein the application further comprises a software module to perform prediction.

125. The system of clause 124, wherein the prediction comprises predicting a demand of the individual.

126. The system of clause 124, wherein the prediction comprises predicting a preference of the individual.

127. The system of clause 124, wherein the prediction comprises predicting a supply of a raw food material.

128. The system of clause 124, wherein the prediction is performed based on a preference.

129. The system of clause 124, wherein the prediction is performed based on historical data.

130. The system of clause 124, wherein the prediction is performed based on a time.

131. The system of clause 124, wherein the prediction is performed based on a month.

132. The system of clause 124, wherein the prediction is performed based on a holiday.

133. The system of clause 124, wherein the prediction is performed based on a season.

134. The system of clause 124, wherein the prediction is performed based on an event.

135. Non-transitory computer-readable storage media encoded with a computer program including instructions executable by a processor to create an application for log data analysis and deduplication, the application comprising: a software module configured to provide an individual with an ordering interface to place a meal order; a software module configured to receive the meal order and locate a nearest restaurant for meal preparation; a software module configured to provide a restaurant staff with guidance for preparing the meal order; and a software module configured to configure a cabinet to hold a prepared meal.

136. The media of clause 135, wherein the ordering interface comprises displaying a menu.

137. The media of clause 136, wherein the menu is personalized to the individual based on one or more of: a preference of that individual; historical orders of the individual; a then current time of day; a then current month of a year; a holiday; a season; an event.

138. The media of clause 135, wherein the ordering interface is programmed to accept input to select ingredients of a meal.

139. The media of clause 135, wherein the ordering interface comprises displaying a pickup location.

140. The media of clause 135, wherein the locating the nearest restaurant comprising retrieving a current location of the individual.

141. The media of clause 135, wherein the locating the nearest restaurant comprising analyzing a distance between the current location of the individual and a restaurant.

142. The media of clause 135, wherein the locating the nearest restaurant comprising analyzing a distance between the current location of the individual and a preparation site.

143. The media of clause 149, wherein the distance comprises a driving distance.

144. The media of clause 149, wherein the distance comprises a walking distance.

145. The media of clause 149, wherein the distance comprises a straight-line distance.

146. The media of clause 135, wherein the guidance for preparing the meal order comprises ingredients of the meal.

147. The media of clause 135, wherein the guidance for preparing the meal order comprises quantity of ingredients.

148. The media of clause 135, wherein the guidance for preparing the meal order comprises weights of ingredients.

149. The media of clause 135, wherein the guidance for preparing the meal order comprises a container for holding the prepared meal.

150. The media of clause 135, wherein the guidance for preparing the meal order comprises indicating the cabinet to hold the prepared meal.

151. The media of clause 135, wherein the cabinet comprises a digital screen.

152. The media of clause 151, wherein the digital screen is configured to display data or indicia, such as a dynamic brand graphic, when the cabinet is vacant.

153. The media of clause 151, wherein the digital screen is configured to display data or indicia, such as a dynamic brand graphic, when the cabinet is vacant.

154. The media of clause 151, wherein the digital screen is configured to go dark when the restaurant staff is loading the prepared meal.

155. The media of clause 151, wherein the digital screen is configured to go clear, so that the product in the cubby is visible through the front door and digital screen, when the prepared meal is securely in place.

156. The media of clause 151, wherein the digital screen is configured to display an order number when the prepared meal is securely in place.

157. The media of clause 151, wherein the digital screen is configured to display a name of the individual when the prepared meal is securely in place.

158. The media of clause 151, wherein the digital screen is configured to allow the individual to activate an opening mechanism.

159. The media of clause 151, wherein the digital screen is configured to automatically open a front door upon the individual correctly activating an opening mechanism.

160. The media of clause 151, wherein the digital screen is configured to detect that the prepared meal has been retrieved by the individual.

161. The media of clause 135, wherein the application further comprises a database.

162. The media of clause 161, wherein the database is configured to store historical meal orders.

163. The media of clause 161, wherein the database is configured to store current supply of raw food materials.

164. The media of clause 161, wherein the database is configured to store preferences of the individual.

165. The media of clause 161, wherein the database is configured to store interests of the individual.

166. The media of clause 135, wherein the application further comprises a software module to perform prediction.

167. The media of clause 166, wherein the prediction comprises predicting a demand of the individual.

168. The media of clause 166, wherein the prediction comprises predicting a preference of the individual.

169. The media of clause 166, wherein the prediction comprises predicting a supply of a raw food material.

170. The media of clause 166, wherein the prediction is performed based on a preference.

171. The media of clause 166, wherein the prediction is performed based on historical data.

172. The media of clause 166, wherein the prediction is performed based on a time.

173. The media of clause 166, wherein the prediction is performed based on a month.

174. The media of clause 166, wherein the prediction is performed based on a holiday.

175. The media of clause 166, wherein the prediction is performed based on a season.

176. The media of clause 166, wherein the prediction is performed based on an event.

5. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A device for housing and delivering a product to a designated recipient, the device comprising:
    a digital processor, a memory module coupled to the digital processor and a network interface coupled to the digital processor;
    a cabinet comprising a cubby and a front door, wherein the front door comprises a digital screen and is coupled to the digital processor via a network;
    one or more sensors that are located in the cubby and are configured to monitor an interior space of the cubby;
    wherein the memory module stores programmed instructions which, when executed using the digital processor, cause the digital processor to configure the digital screen to go dark when the one or more sensors detect that the product is being loaded to the cubby, and to configure the digital screen to go clear, so that the product in the cubby is visible through the front door and digital screen, when the one or more sensors detect that the product has been placed in the cubby.

2. The device of claim 1, wherein the product comprises one or more meals, or one or more prepared meals.

3. The device of claim 1, wherein the cabinet further comprises a back door and wherein the one or more sensors are configured to detect that the product is being loaded to the cubby in response to detecting that the back door has opened.

4. The device of claim 1, wherein the digital screen is configured to display data or indicia when the one or more sensors detect that the cubby is vacant.

5. The device of claim 1, wherein the digital screen is configured to display an order number when the one or more sensors detect that the product has been placed in the cubby.

6. The device of claim 1, wherein the digital screen is configured to display a name of an individual when the one or more sensors detect that the product has been placed in the cubby.

7. The device of claim 1, wherein the front door is configured to automatically open upon an individual correctly activating a mechanism of opening the front door, and wherein the front door is configured to automatically close and the digital screen is configured to display a message when the one or more sensors detect that the product has been retrieved by the individual.

8. The device of claim 1, further comprising a laser shield located at a ceiling, wherein the laser shield is configured to detect an obstruction in a way of the front door when the front door is moving.

9. The device of claim 8, wherein the front door is configured to stop moving when the obstruction is detected.

10. The device of claim 1, wherein the cubby is secured by a cubby locking mechanism comprising any of a biometric recognition mechanism, a facial recognition mechanism, a fingerprint recognition mechanism, a palm print recognition mechanism or an iris recognition mechanism.

11. The device of claim 1, further comprising a heating apparatus and a cooling apparatus that is controlled by a temperature controller that maintains the cubby in a temperature based on a type of the product.

12. A device for housing and delivering a product to a designated recipient, the device comprising:
    a digital processor, a memory module coupled to the digital processor and a network interface coupled to the digital processor;
    a cabinet comprising a cubby and a front door, wherein the front door comprises a digital screen and is coupled to the digital processor via a network;

one or more sensors that are located in the cubby and are configured to monitor an interior space of the cubby;

wherein the memory module stores programmed instructions which, when executed using the digital processor, cause the digital processor to configure the digital screen to go dark when the one or more sensors detect that the product is being loaded to the cubby, and to configure the digital screen to go clear, so that the product in the cubby is visible through the front door and digital screen, when the one or more sensors detect that the product has been placed in the cubby, wherein the one or more sensors detect that the product has been placed in the cubby, and to configure the digital screen to display a message when the one or more sensors detect that the product has been retrieved from the cubby.

13. The device of claim 12, wherein the cabinet further comprises a back door and wherein the one or more sensors are configured to detect that the product is being loaded to the cubby in response to detecting that the back door has opened.

14. The device of claim 12, wherein the front door is configured to automatically open upon an individual correctly activating a mechanism of opening the front door, and wherein the front door is configured to automatically close and the digital screen is configured to display the message when the one or more sensors detect that the product has been retrieved by the individual.

15. The device of claim 12, further comprising a laser shield located at a ceiling, wherein the laser shield is configured to detect an obstruction in a way of the front door when the front door is moving.

16. The device of claim 15, wherein the front door is configured to stop moving when the obstruction is detected.

17. The device of claim 12, wherein the cubby is secured by a cubby locking mechanism comprising any of a biometric recognition mechanism, a facial recognition mechanism, a fingerprint recognition mechanism, a palm print recognition mechanism or an iris recognition mechanism.

18. The device of claim 12, further comprising a heating apparatus and a cooling apparatus that is controlled by a temperature controller that maintains the cubby in a temperature based on a type of the product.

19. A device for housing and delivering a product to a designated recipient, the device comprising:

a digital processor, a memory module coupled to the digital processor and a network interface coupled to the digital processor;

a cabinet comprising a cubby, a back door, and a front door, wherein the front door comprises a digital screen and is coupled to the digital processor via a network;

one or more sensors that are located in the cubby and are configured to monitor an interior space of the cubby;

wherein the memory module stores programmed instructions which, when executed using the digital processor, cause the digital processor to configure the digital screen to go dark while the front door remains locked when the one or more sensors detect that the product is being loaded to the cubby from the back door, and to configure the digital screen to go clear while the front door remains unlocked, so that the product in the cubby is visible through the front door and digital screen.

20. The device of claim 19, wherein the one or more sensors are configured to detect that the product is being loaded to the cubby in response to detecting that the back door has opened.

21. The device of claim 19, wherein the front door is configured to automatically open upon an individual correctly activating a mechanism of opening the front door, and wherein the front door is configured to automatically close and the digital screen is configured to display a message when the one or more sensors detect that the product has been retrieved by the individual.

22. The device of claim 19, further comprising a laser shield located at a ceiling, wherein the laser shield is configured to detect an obstruction in a way of the front door when the front door is moving.

23. The device of claim 22, wherein the front door is configured to stop moving when the obstruction is detected.

24. The device of claim 19, wherein the cubby is secured by a cubby locking mechanism comprising any of a biometric recognition mechanism, a facial recognition mechanism, a fingerprint recognition mechanism, a palm print recognition mechanism or an iris recognition mechanism.

25. The device of claim 19, further comprising a heating apparatus and a cooling apparatus that is controlled by a temperature controller that maintains the cubby in a temperature based on a type of the product.

* * * * *